US012737009B2

(12) United States Patent
Zhu et al.

(10) Patent No.: US 12,737,009 B2
(45) Date of Patent: Sep. 15, 2026

(54) ELECTRONIC DEVICES WITH FLEXIBLE DISPLAYS

(71) Applicant: Apple Inc., Cupertino, CA (US)

(72) Inventors: Wenyong Zhu, Saratoga, CA (US); ByoungSuk Kim, Palo Alto, CA (US); Hao Chen, Santa Clara, CA (US); Sijun Niu, Santa Clara, CA (US); Wei Lv, San Jose, CA (US); Han-Chieh Chang, San Jose, CA (US); Zhen Zhang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 160 days.

(21) Appl. No.: 18/762,440

(22) Filed: Jul. 2, 2024

(65) Prior Publication Data

US 2025/0028364 A1 Jan. 23, 2025

Related U.S. Application Data

(60) Provisional application No. 63/584,801, filed on Sep. 22, 2023, provisional application No. 63/514,945, filed on Jul. 21, 2023, provisional application No. 63/514,993, filed on Jul. 21, 2023.

(51) Int. Cl.
*G06F 1/16* (2006.01)
*G01L 1/22* (2006.01)

(52) U.S. Cl.
CPC .......... *G06F 1/1652* (2013.01); *G01L 1/2281* (2013.01)

(58) Field of Classification Search
CPC .... G06F 1/1637; G06F 1/1652; G06F 1/1656; G06F 1/1681; G01L 1/2281
USPC .................................................... 361/679.21
See application file for complete search history.

(56) References Cited

U.S. PATENT DOCUMENTS

| | | | |
|---|---|---|---|
| 9,615,473 | B2 | 4/2017 | Kim |
| 9,768,198 | B2 | 9/2017 | Kawata |
| 9,937,698 | B2 | 4/2018 | Yasumoto et al. |
| 10,334,750 | B2 | 6/2019 | Koo et al. |
| 10,342,121 | B2 | 7/2019 | Koo et al. |
| 10,686,148 | B2 | 6/2020 | Jang et al. |

(Continued)

FOREIGN PATENT DOCUMENTS

| | | | | | |
|---|---|---|---|---|---|
| CN | 108153075 | A | * | 6/2018 | ........... G02F 1/1368 |
| KR | 102515942 | B1 | * | 3/2023 | ........... H10K 77/111 |
| WO | 2023162221 | A1 | | 8/2023 | |

*Primary Examiner* — Imani N Hayman
*Assistant Examiner* — Ross Terry Mularski
(74) *Attorney, Agent, or Firm* — Treyz Law Group, P.C.; Joseph F. Guihan; Jinie M. Guihan

(57) ABSTRACT

An electronic device may have a hinge that allows the device to be flexed about a bend axis. A display may span the bend axis. The device may have a stainless steel and/or carbon fiber reinforced polymer layer with slots. The slots may overlap the bend axis. The slots may have at least one property that varies in a non-linear manner as a function of position on the layer. The device may include an adhesive layer with a cutout that overlaps the slots. An interface that defines the cutout may have a plurality of recesses with varying depths. A flexible printed circuit may be attached to an edge of the display panel. The display cover layer may overlap a bonding region between the flexible printed circuit and the edge of the display panel. A UV-curable gap filler may be interposed between the flexible printed circuit and the display cover layer.

20 Claims, 30 Drawing Sheets

(56) References Cited

U.S. PATENT DOCUMENTS

| | | | | |
|---|---|---|---|---|
| 11,143,797 | B2 * | 10/2021 | Chen | G02F 1/133526 |
| 11,385,683 | B2 | 7/2022 | Vartanian | |
| 11,402,879 | B2 | 8/2022 | Li et al. | |
| 11,488,499 | B2 * | 11/2022 | Shepelev | G01B 7/30 |
| 11,520,423 | B2 | 12/2022 | Reynolds et al. | |
| 11,586,243 | B2 * | 2/2023 | Yildiz | G06F 1/1681 |
| 2004/0008191 | A1 | 1/2004 | Poupyrev et al. | |
| 2006/0238494 | A1 | 10/2006 | Narayanaswami et al. | |
| 2013/0222306 | A1 * | 8/2013 | Aberg | G01L 1/2281 374/185 |
| 2014/0101560 | A1 * | 4/2014 | Kwak | G06F 3/0488 715/788 |
| 2014/0240108 | A1 | 8/2014 | Matthews | |
| 2016/0104850 | A1 | 4/2016 | Joo et al. | |
| 2017/0263890 | A1 | 9/2017 | Chun | |
| 2017/0294495 | A1 | 10/2017 | Shyu et al. | |
| 2017/0309843 | A1 | 10/2017 | Kim | |
| 2018/0173028 | A1 | 6/2018 | Koppal et al. | |
| 2018/0174505 | A1 | 6/2018 | Mandlik et al. | |
| 2018/0224340 | A1 | 8/2018 | Koppal et al. | |
| 2020/0166970 | A1 | 5/2020 | Yeom | |
| 2021/0303033 | A1 | 9/2021 | Hong et al. | |
| 2023/0266850 | A1 | 8/2023 | Bok et al. | |

* cited by examiner

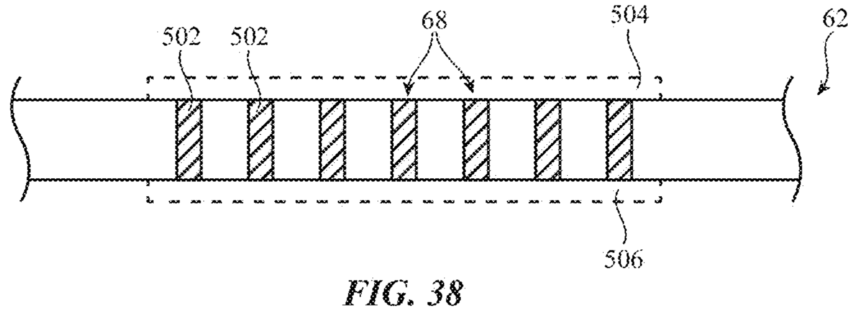
FIG. 38
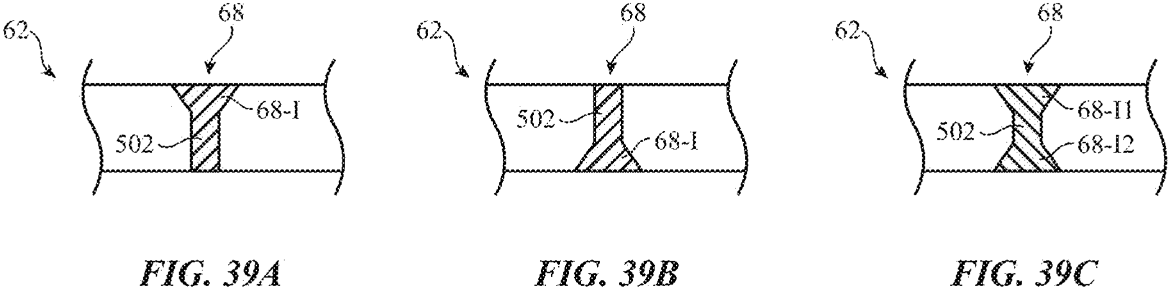
FIG. 39A
FIG. 39B
FIG. 39C

ELECTRONIC DEVICES WITH FLEXIBLE DISPLAYS

This application claims the benefit of U.S. provisional patent application No. 63/514,945, filed Jul. 21, 2023, U.S. provisional patent application No. 63/514,993, filed Jul. 21, 2023, and U.S. provisional patent application No. 63/584,801, filed Sep. 22, 2023, which are hereby incorporated by reference herein in their entireties.

FIELD

This relates generally to electronic devices, and, more particularly, to electronic devices with displays.

BACKGROUND

Electronic devices often include displays for presenting images to a user. Displays are typically formed from rigid planar substrates. Although satisfactory in many situations, rigid displays such as these may be difficult to integrate into certain devices, such as devices with bendable housings.

SUMMARY

An electronic device may include a flexible display with a first portion, a second portion that is aligned with a bend axis that extends in a first direction, and a third portion and a layer that overlaps the flexible display. The second portion may be interposed between the first and third portions, the first portion may be configured to bend relative to the third portion about the bend axis, the layer may have a portion with slots that overlaps the second portion of the flexible display, and the slots may have a property that varies in the first direction.

An electronic device may include a flexible display with a first portion, a second portion that is aligned with a bend axis that extends in a first direction, and a third portion and a layer that overlaps the flexible display. The second portion may be interposed between the first and third portions, the first portion may be configured to bend relative to the third portion about the bend axis, the layer may have a fourth portion that overlaps the first portion, a fifth portion that overlaps the second portion, and a sixth portion that overlaps the third portion, the fifth portion of the layer may include a first material with slots, and the fourth and sixth portions of the layer may include a second material that is different than the first material.

An electronic device may include a flexible display with a first portion, a second portion that is aligned with a bend axis that extends in a first direction, and a third portion and a layer that overlaps the flexible display. The second portion may be interposed between the first and third portions, the first portion may be configured to bend relative to the third portion about the bend axis, the layer may have a portion with slots that overlaps the second portion of the flexible display, the layer may include first, second, and third carbon fiber reinforced polymer sublayers, and the slots may be formed in the first and second carbon fiber reinforced polymer sublayers but not the third carbon fiber reinforced polymer sublayer.

An electronic device may include a flexible display with a first portion, a second portion that is aligned with a bend axis that extends in a first direction, and a third portion. The second portion may be interposed between the first and third portions, the first portion may be configured to bend relative to the third portion about the bend axis, and the flexible display may include an array of pixels and a thin-film transistor circuitry layer with thin-film transistor circuitry that controls the array of pixels. The electronic device may include at least one strain gauge that is part of the thin-film transistor circuitry layer and that is aligned with the bend axis.

An electronic device may include a flexible display with a first portion, a second portion that is aligned with a bend axis that extends in a first direction, and a third portion. The second portion may be interposed between the first and third portions and the first portion may be configured to bend relative to the third portion about the bend axis. The electronic device may also include at least one strain gauge that is aligned with the bend axis, wherein data from the at least one strain gauge is used to determine a speed associated with bending the flexible display, and an output device configured to output a notification based on the speed associated with bending the flexible display.

An electronic device may include a flexible display with a first portion, a second portion that is aligned with a bend axis that extends in a first direction, and a third portion. The second portion may be interposed between the first and third portions and the first portion may be configured to bend relative to the third portion about the bend axis. The electronic device may also include a display cover layer that overlaps the flexible display and that has an upper surface and a side surface, a first adhesive layer between the flexible display and the display cover layer, and a second adhesive layer that conforms to and directly contacts the upper surface and the side surface of the display cover layer.

An electronic device may include a flexible display with a first portion, a second portion that is aligned with a bend axis, and a third portion. The second portion may be interposed between the first and third portions and the first portion may be configured to bend relative to the third portion about the bend axis. The electronic device may also include a layer that overlaps the flexible display. The layer may have a portion with slots that overlaps the second portion of the flexible display and the slots may have at least one property that varies in a non-linear manner as a function of position on the layer.

An electronic device may include a flexible display with a first portion, a second portion that is aligned with a bend axis, and a third portion. The second portion may be interposed between the first and third portions and the first portion may be configured to bend relative to the third portion about the bend axis. The electronic device may also include a layer that overlaps the flexible display, the layer having a portion with slots that overlaps the second portion of the flexible display, and an adhesive layer that is interposed between the flexible display and the layer, the adhesive layer having a cutout that overlaps the second portion of the flexible display.

An electronic device may include a display panel that includes an array of display pixels, a flexible printed circuit that is attached to an edge of the display panel, a display cover layer that overlaps the display panel, and a gap filler that is interposed between the display cover layer and the display panel. The gap filler may have a first portion between the display cover layer and the display panel that has a first thickness and a second portion between the display cover layer and the flexible printed circuit that has a second thickness that is less than the first thickness.

An electronic device may include a flexible display with a first portion, a second portion that is aligned with a bend axis, and a third portion. The second portion may be interposed between the first and third portions and the first portion may be configured to bend relative to the third portion about the bend axis. The electronic device may also include at least one strain gauge that is aligned with the bend axis, a touch sensor layer configured to generate touch sensor data, and control circuitry configured to predict a crease level based on data from the at least one strain gauge and compensate the touch sensor data based on the predicted crease level.

BRIEF DESCRIPTION OF THE DRAWINGS

FIG. 38 is a cross-sectional side view of an illustrative bending layer with slots filled with a filler material in accordance with some embodiments.

FIGS. 39A-39C are cross-sectional side views of illustrative bending layers with slots having interlock features in accordance with some embodiments.

DETAILED DESCRIPTION

Figure 1:
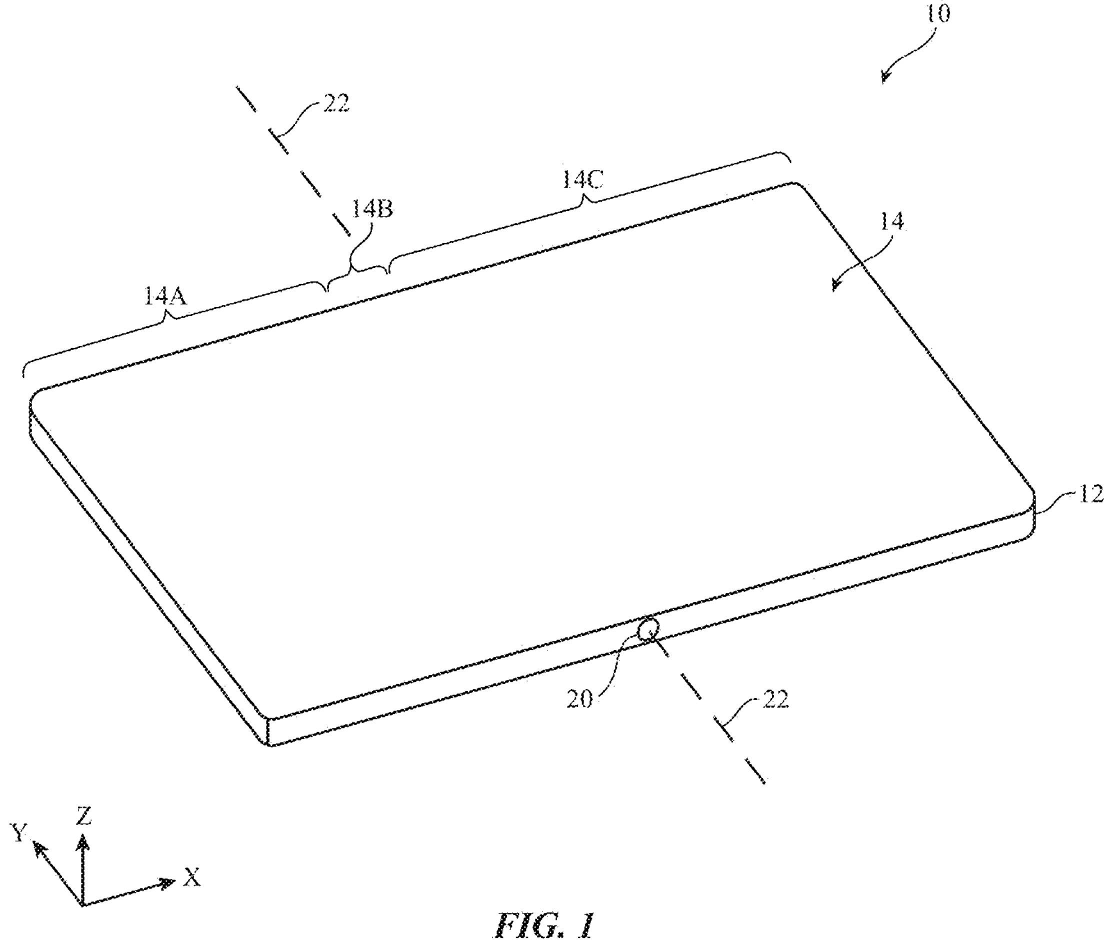
FIG. 1 is a perspective view of an illustrative electronic device having a display in accordance with some embodiments.

An illustrative electronic device of the type that may be provided with a flexible display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a wearable or miniature device of other types, a computer display that does not contain an embedded computer, a computer display that includes an embedded computer, a gaming device, a navigation device, a head-mounted device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a cellular telephone, media player, tablet computer, watch or other wrist device, or other portable computing device. Other configurations may be used for device 10 if desired. The example of FIG. 1 is merely illustrative.

In the example of FIG. 1, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have hinge structures such as hinge 20 to allow device 10 to bend about bend axis 22. Housing 12 may have first and second housing portions that rotate with respect to each other as device 10 is bent (folded) about bend axis 22 using hinge 20 or other flexible structures joining the first and second housing portions.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. A touch sensor may be formed using electrodes or other structures on a display layer that contains a pixel array or on a separate touch panel layer that is attached to the pixel array (e.g., using adhesive).

Display 14 may include pixels formed from liquid crystal display (LCD) components, electrophoretic pixels, microelectromechanical (MEMs) shutter pixels, electrowetting pixels, micro-light-emitting diodes (small crystalline semiconductor die), organic light-emitting diodes (e.g., pixels in a thin-film organic light-emitting diode display), or pixels based on other display technologies. Configurations in which display 14 has an array of light-emitting pixels such as an array of organic light-emitting diode pixels may sometimes be described herein as an example.

Display 14 may have a portion that overlaps bend axis 22. To facilitate bending of device 10 about axis 22, all of display 14 may be formed using flexible structures or at least the portion of display 10 that overlaps bend axis 22 may be formed using flexible structures. A display cover layer or other layer may form the outermost surface of the display. Display layers such these (e.g., display cover layers) may be formed from glass, plastic, and/or other transparent display cover layer structures and may be flexible (at least where these layers overlap bend axis 22 of device 10).

As shown in FIG. 1, for example, display 14 may have three portions such as portions 14A, 14B, and 14C. In portions 14A and 14C, display 14 may be flexible or may be rigid (e.g., the pixel array in these areas may be rigid and/or the display cover layer structures in these regions may be rigid). Flexible portion 14B overlaps bend axis 22 and forms a strip that lies between portions 14A and 14C and that extends across the width of the display between opposing edges of the display. To ensure that flexible portion 14B is sufficiently flexible to allow device 10 to bend about axis 22, display layers such as a display cover layer for display 14 may be formed from a thin flexible glass or polymer layer that accommodates bending of display 14 about axis 22 and underlying display layers (e.g., a polymer substrate, metal traces, a polarizer layer, a touch sensor layer, adhesive layers, and other conducting and dielectric layers in an organic light-emitting diode pixel array) may also be formed from flexible materials and structures.

Figure 2:
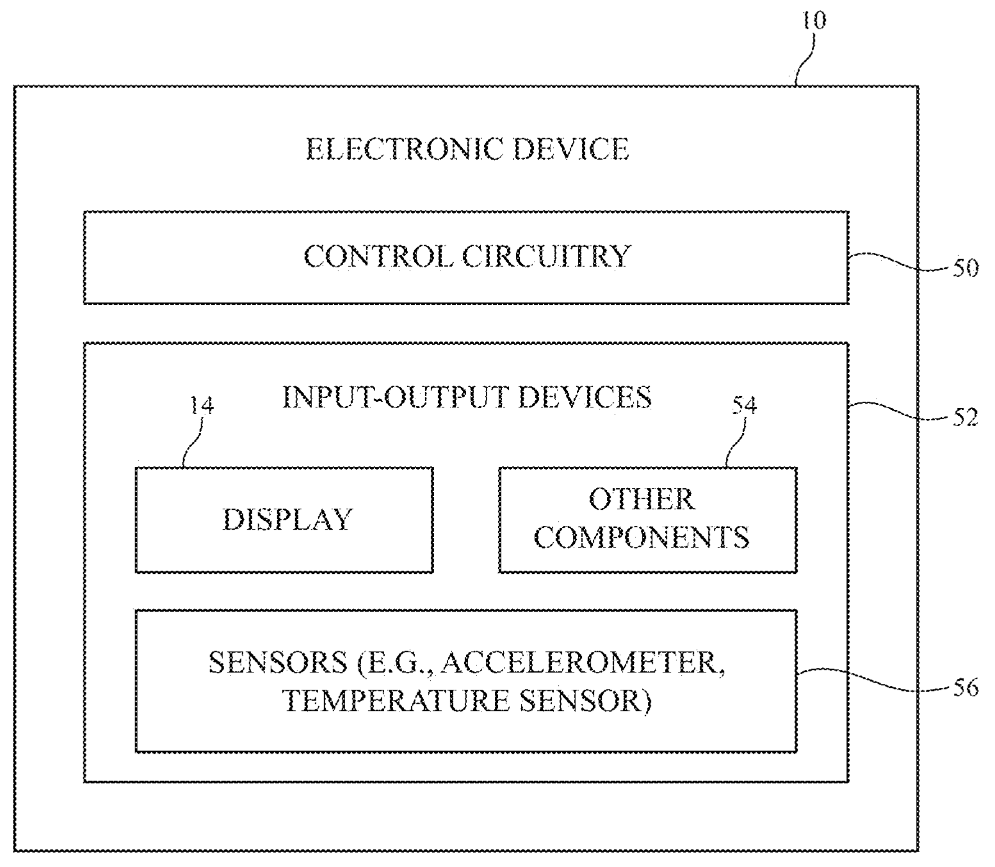
FIG. 2 is a schematic diagram of an illustrative electronic device having a display in accordance with some embodiments.

A schematic diagram of an illustrative electronic device such as device 10 of FIG. 1 is shown in FIG. 2. As shown in FIG. 2, electronic device 10 may have control circuitry 50. Control circuitry 50 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 50 may be used to control the operation of device 10 (e.g., to process sensor signals and other input and to control adjustable components such as a display, a heating element, etc.). The processing circuitry may be based on one or more microprocessors, microcontrollers, digital signal processors, baseband processors, power management units, audio chips, application specific integrated circuits, etc.

Input-output circuitry in device 10 such as input-output devices 52 may be used to allow data to be supplied to device 10 and to allow data to be provided from device 10 to external devices. As shown in FIG. 2, input-output devices 52 may include display 14. Display 14 may be a touch screen that incorporates a two-dimensional touch sensor or may be insensitive to touch. A two-dimensional touch sensor for display 14 may be formed from an array of capacitive touch electrodes touch sensor or other touch sensor components (e.g., force sensors, resistive touch sensors, acoustic touch sensors, optical sensors, etc.).

Input-output devices 52 may include sensors 56. Sensors 56 may include a capacitive proximity sensor, a light-based proximity sensor, a magnetic sensor, a force sensor such as a force sensor that gathers user input, a touch sensor for gathering user touch input, a temperature sensor, a pressure sensor, an ambient light sensor, a microphone or other sound sensor that gathers ambient noise measurements and user input such as voice commands, sensors for gathering data on device position and motion such as inertial measurement units that include accelerometers, compasses, and/or gyroscopes, and/or other sensors.

Input-output devices 52 may also include other components 54 such as buttons, joysticks, scrolling wheels, touch pads, key pads, keyboards, speakers, tone generators, vibrators (sometimes referred to as haptic output devices), cameras, light-emitting diodes and other status indicators, data ports, etc. A user can control the operation of device 10 by supplying user input commands through input-output devices 52 and may receive status information and other output from device 10 using the output resources of input-output devices 52.

Control circuitry 50 may be used to run software on device 10 such as operating system code and applications. During operation of device 10, the software running on control circuitry 50 may display images on display 14 (e.g., video, still images such as text, alphanumeric labels, photographs, icons, other graphics, etc.) using an array of pixels in display 14.

Figure 3:
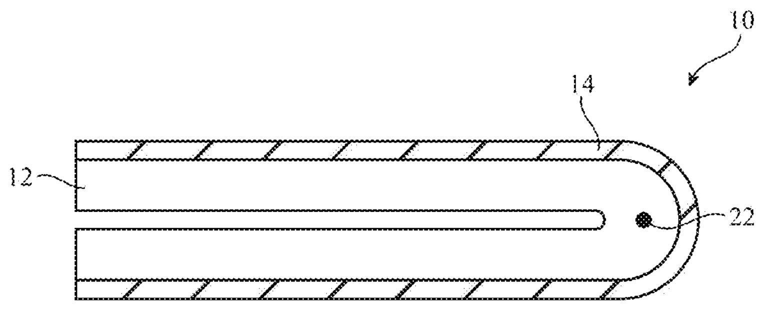
FIGS. 3 and 4 are cross-sectional side views of electronic devices with flexible displays in accordance with some embodiments.
Figure 4:
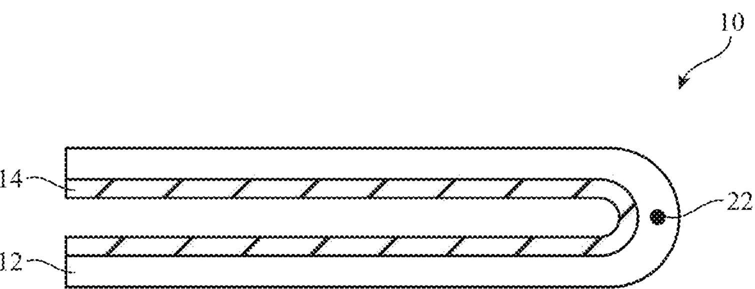

As shown in FIG. 3, device 10 may be folded (bent by 180° or other suitable amount) about bend axis 22 so that display 14 is visible from the outside of device 10 in its folded state. FIG. 4 shows how device 10 may be folded about bend axis 22 so that display 14 is protected within the interior of device 10. Device 10 may have flexible structures (e.g., a hinge) to allow outward bending of the type shown in FIG. 3, to allow inward bending of the type shown in FIG. 4, or to allow bending of both the type shown in FIG. 3 and the type shown in FIG. 4. Configurations in which device 10 is flexed by different amounts (e.g., more than 180° or less than 180°) may also be used.

Figure 5:
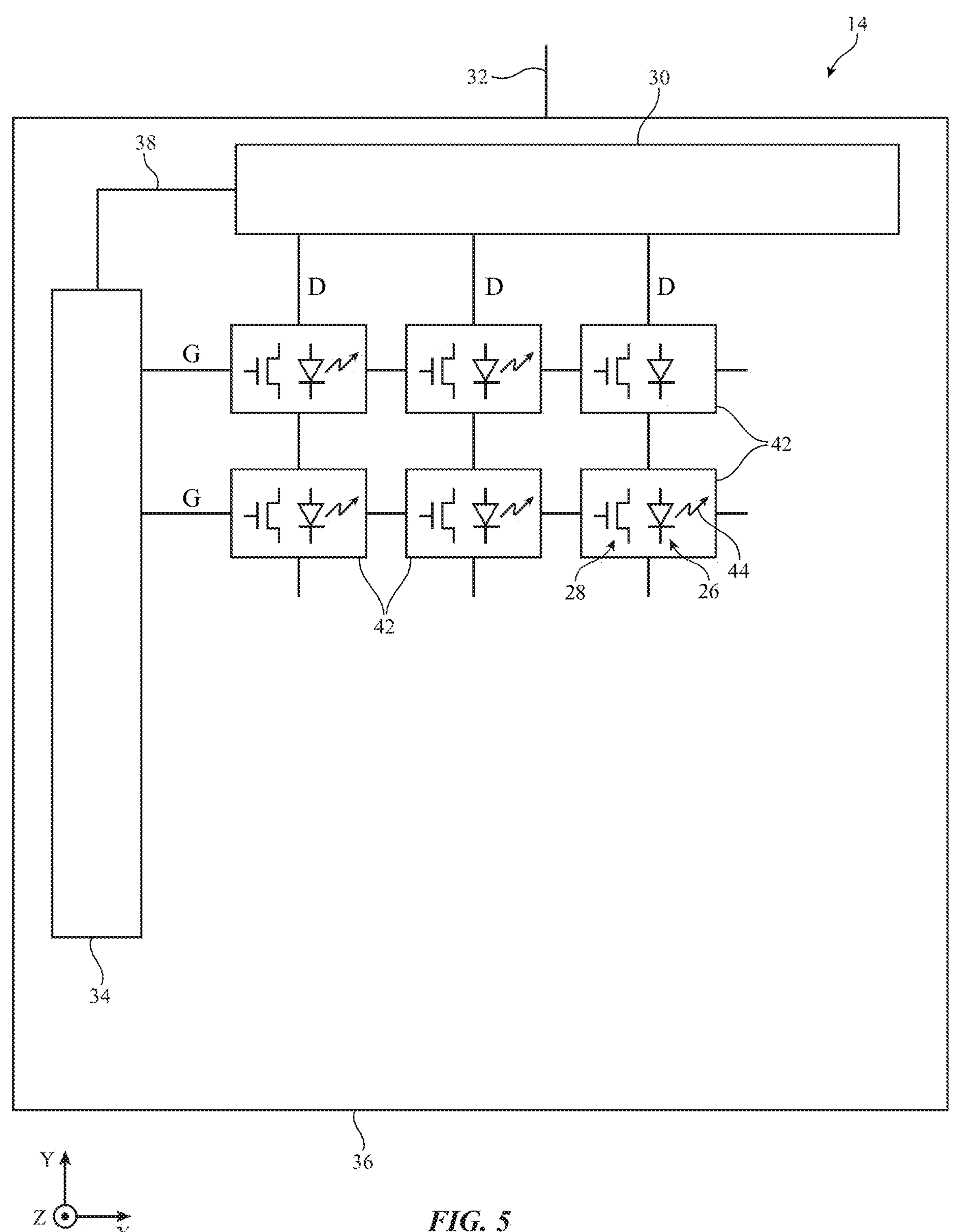
FIG. 5 is a diagram of an illustrative display with an array of light-emitting pixels in accordance with some embodiments.

Display 14 may have a rectangular shape (i.e., display 14 may have a rectangular footprint and a rectangular peripheral edge that runs around the rectangular footprint) or may have other suitable shapes. A top view of circuitry in an illustrative display with a rectangular shape is shown in FIG. 5. As shown in FIG. 5, display 14 may have an array of pixels 42 formed on substrate 36. Substrate 36 may be formed from glass, metal, plastic, ceramic, or other substrate materials. Pixels 42 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 42 in display 14 (e.g., tens or more, hundreds or more, or thousands or more). Each pixel 42 may have a light-emitting diode 26 that emits light 44 under the control of a pixel circuit formed from thin-film transistor circuitry such as thin-film transistors 28 and thin-film capacitors). Thin-film transistors 28 may be polysilicon thin-film transistors, semiconducting-oxide thin-film transistors such as indium gallium zinc oxide transistors, or thin-film transistors formed from other semiconductors. Pixels 42 may contain light-emitting diodes of different colors (e.g., red, green, and blue diodes for red, green, and blue pixels, respectively) to provide display 14 with the ability to display color images.

Display driver circuitry may be used to control the operation of pixels 42. The display driver circuitry may be formed from integrated circuits, thin-film transistor circuits, or other suitable circuitry. Display driver circuitry 30 of FIG. 2 may contain communications circuitry for communicating with system control circuitry such as control circuitry 50 of FIG. 2 over path 32. Path 32 may be formed from traces on a flexible printed circuit or other cable. During operation, the control circuitry (e.g., control circuitry 50 of FIG. 2) may supply circuitry 30 with information on images to be displayed on display 14.

To display the images on pixels 42, display driver circuitry 30 may supply image data to data lines D while issuing clock signals and other control signals to supporting display driver circuitry such as gate driver circuitry 34 over path 38. If desired, circuitry 30 may also supply clock signals and other control signals to gate driver circuitry on an opposing edge of display 14 or may use display driver circuitry with other layouts. The configuration of FIG. 5 is illustrative.

Gate driver circuitry 34 (sometimes referred to as horizontal control line control circuitry) may be implemented as part of an integrated circuit and/or may be implemented using thin-film transistor circuitry. Gate lines G (sometimes referred to as horizontal control lines) in display 14 may carry gate line signals (sometimes referred to as scan line signals, emission enable control signals, etc.) for controlling the pixels of each row. There may be any suitable number of control signals per row of pixels 42 (e.g., one or more, two or more, three or more, four or more, etc.).

Figure 6:
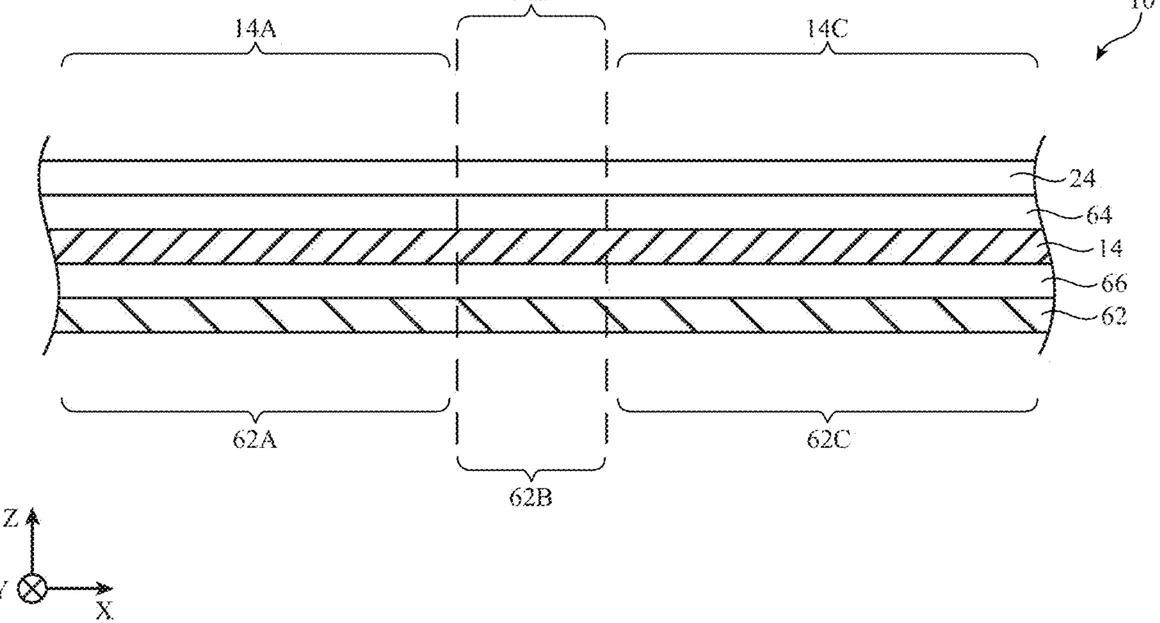
FIG. 6 is a cross-sectional side view of an illustrative electronic device with a flexible display, a display cover layer, and a layer with slots in accordance with some embodiments.

FIG. 6 is a cross-sectional side view of an illustrative electronic device with a flexible display. FIG. 6 shows flexible display 14 with portions 14A and 14C that may be rigid or flexible as well as flexible portion 14B. As shown in FIG. 6, display 14 is overlapped by a display cover layer 24. Display cover layer 24 is attached to display 14 with adhesive layer 64.

Display cover layer 24 may be a transparent layer formed from glass, polymer, sapphire, or any other desired material. The display cover layer may have a high transparency (e.g., greater than 80%, greater than 90%, greater than 95%, greater than 99%, etc.). Adhesive layer 64 may be formed from optically clear adhesive layer 64 and may have a high transparency (e.g., greater than 80%, greater than 90%, greater than 95%, greater than 99%, etc.). Display cover layer 24 may have a thickness that is less than 200 microns, less than 100 microns, less than 50 microns, less than 30 microns, greater than 10 microns, greater than 20 microns, greater than 50 microns, between 20 microns and 90 microns, between 10 microns and 200 microns, etc.

As shown in FIG. 6, electronic device 10 may include a layer 62 (sometimes referred to as bending layer 62, bend-promotion layer 62, perforated layer 62, patterned layer 62, Kirigami plate 62, Kirigami layer 62, etc.) that is attached to display 14 using adhesive layer 66. Display 14 may be interposed between display cover layer 24 and layer 62. Adhesive layer 66 may be formed from pressure sensitive adhesive or any other desired type of adhesive. Layer 62 may have portions such as portions 62A, 62B, and 62C that overlap display portions 14A, 14B, and 14C, respectively. The footprint of portion 62A may be approximately the same (e.g., within 5% of) as the footprint of display portion 14A. The footprint of portion 62B may be approximately the same (e.g., within 5% of) as the footprint of display portion 14B. The footprint of portion 62C may be approximately the same (e.g., within 5% of) as the footprint of display portion 14C.

Portions 62A and 62C of layer 62 may be rigid. These portions may have an effective Young's modulus of at least 50 GPa, at least 100 GPa, at least 150 GPa, etc. Portion 62B of layer 62, meanwhile, may be flexible. Portion 62B may have an effective Young's modulus that is less than the effective Young's modulus of portions 62A and 62B. Different regions of portion 62B may have different effective Young's moduli. For a given region of portion 62B, the effective Young's modulus may be less than 100 GPa, less than 50 GPa, less than 20 GPa, less than 10 GPa, less than 5 GPa, less than 1 GPa, etc.

To increase the flexibility of layer 62 in portion 62B, portion 62B may include one or more openings or slots. Each opening or slot in layer 62 may extend completely through the thickness of layer 62 (e.g., in the Z-direction of FIG. 6) or may extend only partially through the thickness of layer 62.

Bend axis 22 overlaps and is parallel to portion 62B of layer 62. Layer 62 has openings to promote flexibility and is configured to bend along the bend axis 22. Layer 62 may therefore sometimes be referred to as a Kirigami plate or Kirigami layer. Layer 62 may be formed from stainless steel, carbon fiber, a polymer material, and/or any other desired material.

Figure 7:
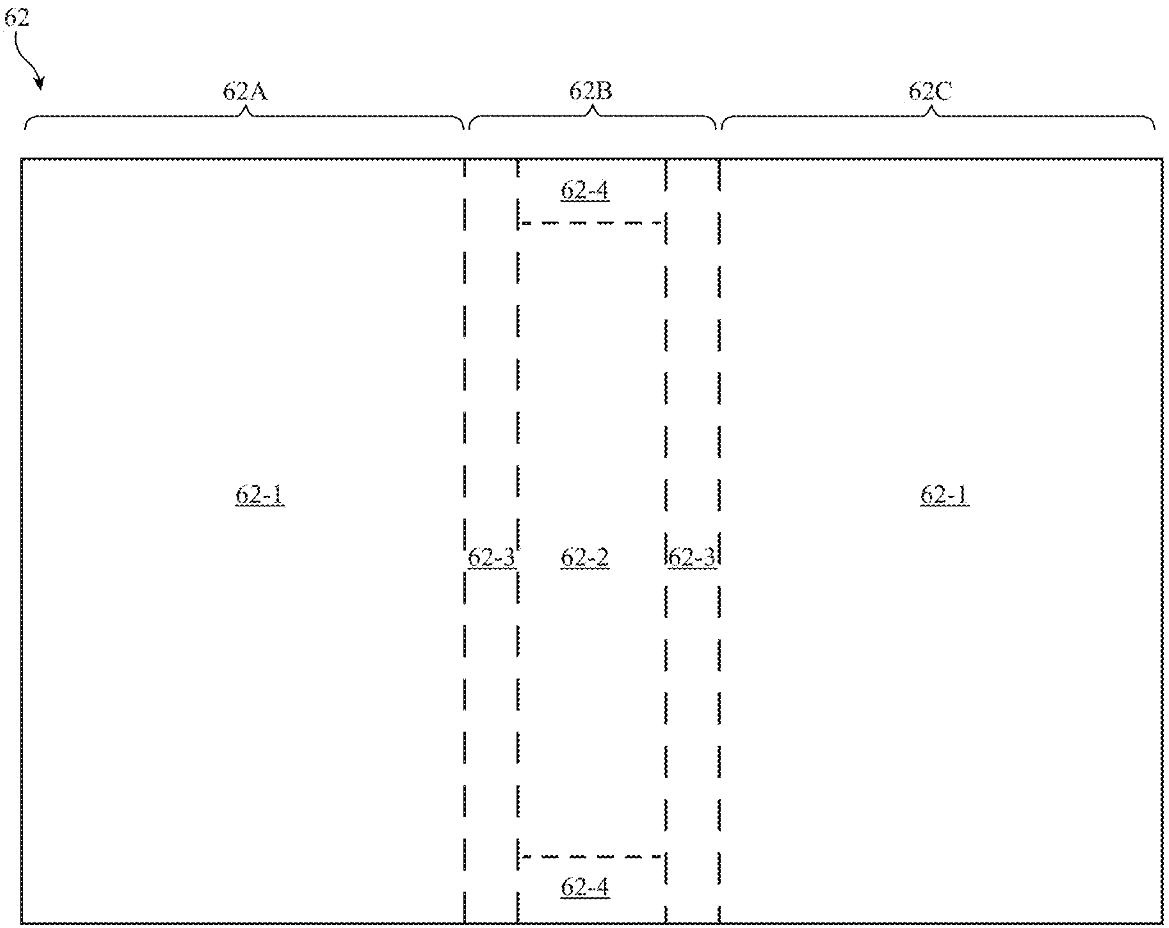
FIG. 7 is a top view of an illustrative layer with slots in a hinge region, transition regions, and edge regions in accordance with some embodiments.
Figure 7:
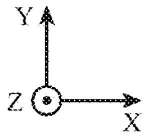

FIG. 7 is a top view of layer 62 showing how portion 62B of layer 62 may have different regions with different properties. As shown in FIG. 7, layer 62 includes first regions 62-1 that are aligned with portions 62A and 62C respectively. Each region 62-1 does not include any openings or slots through the thickness of layer 62. Accordingly, regions 62-1 are relatively rigid (e.g., with an effective Young's modulus of at least 50 GPa, at least 100 GPa, at least 150 GPa, etc.).

Portion 62B of layer 62 includes a region 62-2 (sometimes referred to as hinge region 62-2), two regions 62-3 (sometimes referred to as transition regions 62-3), and two regions 62-4 (sometimes referred to as edge regions). A first transition region 62-3 is interposed between hinge region 62-2 and portion 62A. A second transition region 62-3 is interposed between hinge region 62-2 and portion 62C. A first edge region 62-4 is formed on a first side of hinge region 62-2. A second edge region 62-4 is formed on a second, opposing side of hinge region 62-2.

Figure 8:
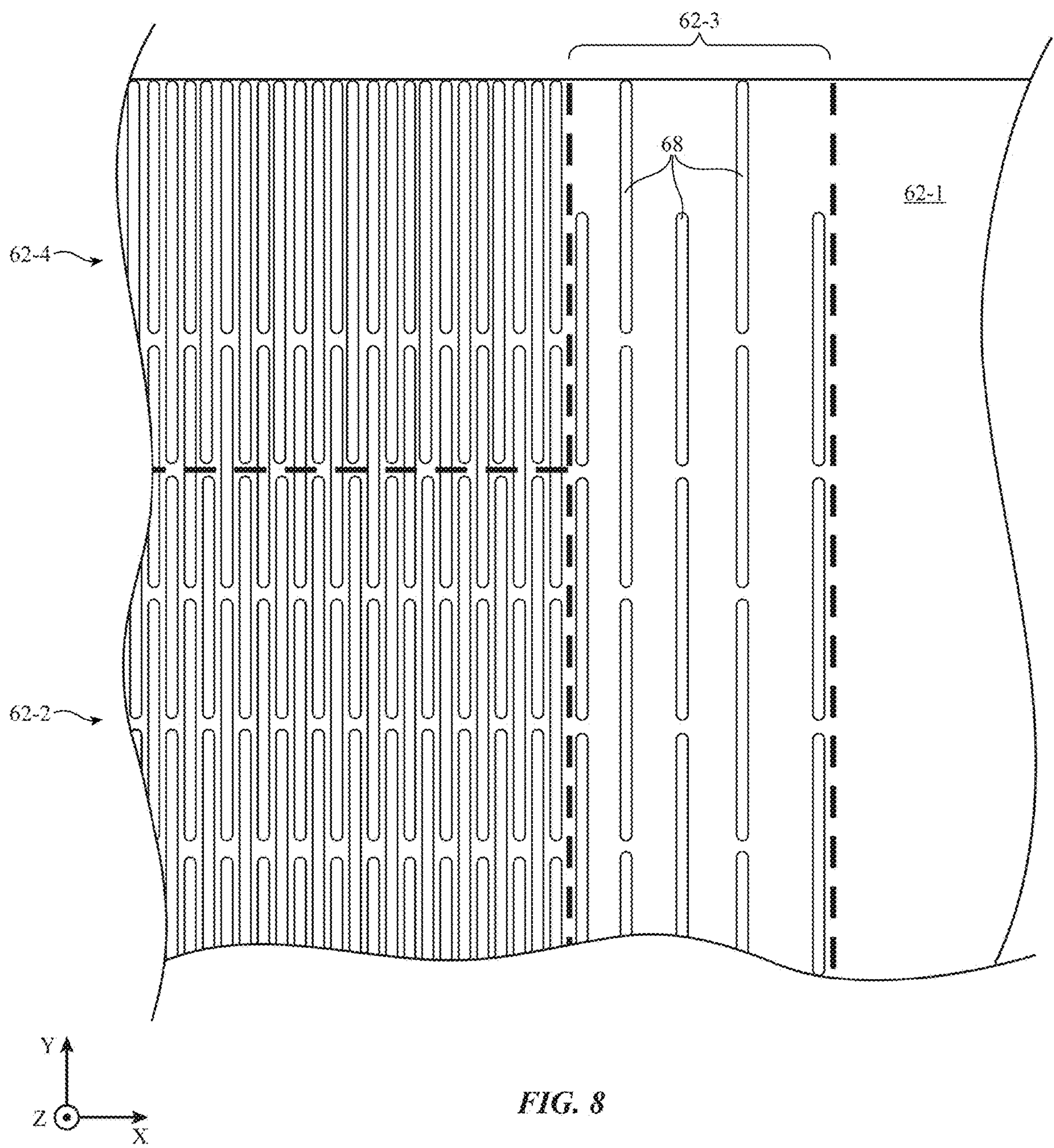
FIG. 8 is a top view of the illustrative layer of FIG. 7 showing the slots in the hinge region, a transition region, and an edge region in accordance with some embodiments.

Each one of regions 62-2, 62-3, and 62-4 in portion 62B may include a plurality of slots (sometimes referred to as openings, recesses, etc.). FIG. 8 is a top view of layer 62 showing the slots. As shown in FIG. 8, each slot 68 may have a width and a length that is longer than the width. In the arrangement of FIG. 8, the length of each slot extends parallel to the bend axis (and the Y-axis) whereas the width of each slot extends orthogonal to the bend axis (and parallel to the X-axis). Each slot may have a thickness (parallel to the Z-axis) that is equal to the thickness of layer 62 or less than the thickness of layer 62. In other words, each slot may extend only partially through layer 62 or may extend completely through layer 62.

As shown in FIG. 8, region 62-1 does not include any slots 68. This keeps region 62-1 relatively rigid. Hinge region 62-2 may have slots 68. Hinge region 62-2 may have an effective Young's modulus that is less than 50 GPa, less than 20 GPa, less than 10 GPa, less than 5 GPa, less than 1 GPa, etc. The effective young's modulus of hinge region 62-2 may be less than 50% the effective Young's modulus of rigid region 62-1, less than 30% the effective Young's modulus of rigid region 62-1, less than 20% the effective Young's modulus of rigid region 62-1, less than 10% the effective Young's modulus of rigid region 62-1, less than 5% the effective Young's modulus of rigid region 62-1, between 1% and 20% the effective Young's modulus of rigid region 62-1, between 5% and 10% the effective Young's modulus of rigid region 62-1, etc.

Transition region 62-3 includes slots 68. Transition region 62-3 may have an effective Young's modulus that is less than 100 GPa, less than 50 GPa, less than 20 GPa, less than 10 GPa, less than 5 GPa, less than 1 GPa, etc. The effective young's modulus of transition region 62-3 may be less than 75% the effective Young's modulus of rigid region 62-1, less than 50% the effective Young's modulus of rigid region 62-1, between 30% and 70% the effective Young's modulus of rigid region 62-1, between 45% and 55% the effective Young's modulus of rigid region 62-1, etc. The effective young's modulus of hinge region 62-2 may be less than 50% the effective Young's modulus of transition region 62-3, less than 30% the effective Young's modulus of transition region 62-3, less than 20% the effective Young's modulus of transition region 62-3, greater than 10% the effective Young's modulus of transition region 62-3, between 5% and 30% the effective Young's modulus of transition region 62-3, between 10% and 20% the effective Young's modulus of rigid region 62-3, etc.

Edge region 62-4 includes slots 68. Edge region 62-4 may have an effective Young's modulus that is less than 50 GPa, less than 20 GPa, less than 10 GPa, less than 5 GPa, less than 1 GPa, less than 0.5 GPa, etc. The effective young's modulus of edge region 62-4 may be less than 10% the effective Young's modulus of rigid region 62-1, less than 5% the effective Young's modulus of rigid region 62-1, less than 1% the effective Young's modulus of rigid region 62-1, etc. The effective young's modulus of edge region 62-4 may be less than 30% the effective Young's modulus of hinge region 62-2, less than 20% the effective Young's modulus of hinge region 62-2, less than 10% the effective Young's modulus of hinge region 62-2, etc.

As one example region 62-1 has an effective Young's modulus of 100 GPa, region 62-2 has an effective Young's modulus of 7 GPa, region 62-3 has an effective Young's modulus of 50 GPa, and region 62-4 has an effective Young's modulus of 1 GPa.

Figure 9:
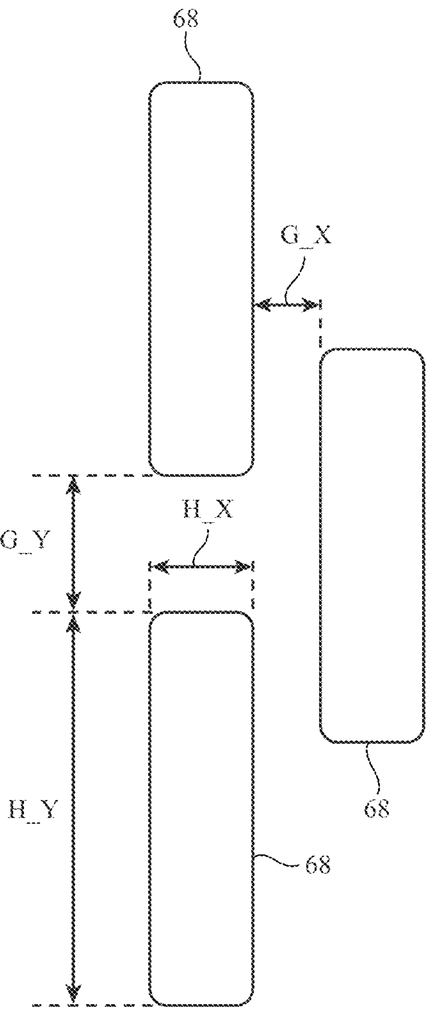
FIG. 9 is a top view of illustrative slots for a Kirigami layer of the type shown in FIGS. 7 and 8 in accordance with some embodiments.
Figure 9:
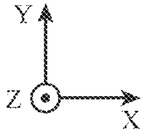

The slots may have properties as illustrated in FIG. 9. As shown in FIG. 9, each slot has a corresponding height along the Y-axis that is referred to herein as H_Y. Each slot has a corresponding height along the X-axis that is referred to herein as H_X. The longer dimension of H_X and H_Y may sometimes be referred to as the length of the slot whereas the shorter dimension of H_X and H_Y may sometimes be referred to as the width of the slot. Adjacent slots may be separated by a first gap (G_X) in the X-direction and a second gap (G_Y) in the Y-direction.

In general, the slots may have any desired dimensions and there may be any desired gaps between the slots. Each slot may have an H_Y of less than 20 millimeters, less than 15 millimeters, less than 10 millimeters, greater than 5 millimeters, greater than 7 millimeters, between 5 millimeters and 10 millimeters, between 5 millimeters and 20 millimeters, etc. Each slot may have an H_X of less than 3 millimeters, less than 2 millimeters, less than 1 millimeter, less than 0.5 millimeters, less than 0.3 millimeters, greater than 0.1 millimeter, between 0.1 millimeter and 0.5 millimeters, etc.

The gap G_X between any two adjacent slots may be less than 5 millimeters, less than 3 millimeters, less than 2 millimeters, less than 1 millimeter, less than 0.5 millimeters, less than 0.3 millimeters, greater than 0.1 millimeter, greater than 1 millimeter, between 0.1 millimeter and 0.5 millimeters, between 0.1 millimeters and 2 millimeters, between 0.1 millimeters and 3 millimeters, etc. The gap G_Y between any two adjacent slots may be less than 5 millimeters, less than 3 millimeters, less than 2 millimeters, less than 1 millimeter, less than 0.5 millimeters, less than 0.3 millimeters, greater than 0.1 millimeter, greater than 1 millimeter, between 0.1 millimeter and 0.5 millimeters, between 0.1 millimeters and 2 millimeters, between 0.1 millimeters and 3 millimeters, etc.

Figure 10:
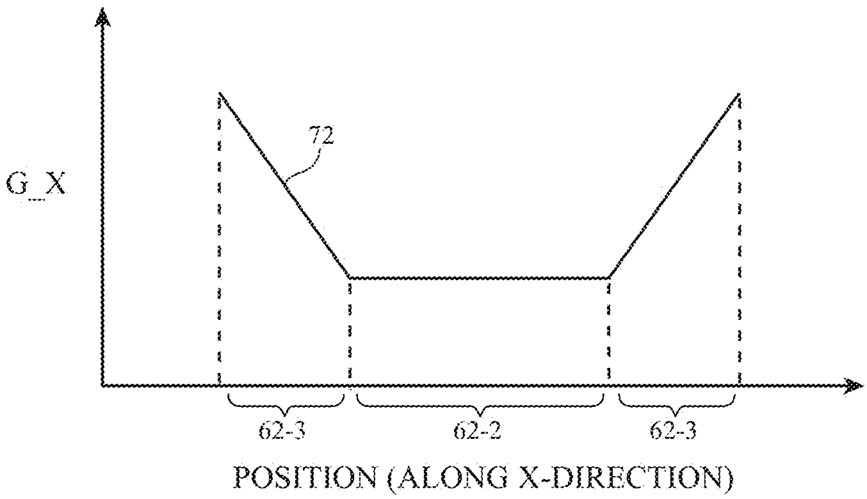
FIG. 10 is a graph of the gap between adjacent slots in the X-direction as a function of position along the X-direction in accordance with some embodiments.

In one or more regions of portion 62B of layer 62, one or more properties of the slots (e.g., H_X, H_Y, G_X, and/or G_Y) may vary along the X-direction and/or along the Y-direction. FIG. 10 shows how G_X may vary as a function of position along the X-direction. As shown by profile 72 in FIG. 10, G_X is constant within hinge region 62-2. However, G_X varies gradually within each region 62-3. In particular, G_X is at a minimum at an edge of region 62-3 that is adjacent to hinge region 62-2. G_X then gradually increases with increasing separation from the hinge region from the minimum magnitude to a maximum magnitude at an edge of region 62-3 that is opposite the edge adjacent to hinge region 62-2.

In other words, transition region 62-3 may have a first pair of adjacent slots that are separated by a first distance (D_1) in the X-direction from hinge region 62-2 and have a first magnitude (G_X_1) for G_X. Transition region 62-3 may have a second pair of adjacent slots that are separated by a second distance (D_2) in the X-direction from hinge region 62-2 and have a second magnitude (G_X_2) for G_X. Transition region 62-3 may have a third pair of adjacent slots that are separated by a third distance (D_3) in the X-direction from hinge region 62-2 and have a third magnitude (G_X_3) for G_X. Transition region 62-3 may have a fourth pair of adjacent slots that are separated by a fourth distance (D_4) in the X-direction from hinge region 62-2 and have a fourth magnitude (G_X_4) for G_X. When the first distance is less than the second distance, the second distance is less than the third distance, and the third distance is less than the fourth distance, then the first magnitude is less than the second magnitude, the second magnitude is less than the third magnitude, and the third magnitude is less than the fourth magnitude (e.g., when D1<D2<D3<D4, then G_X_1<G_X_2<G_X_3<G_X_4).

Figure 11:
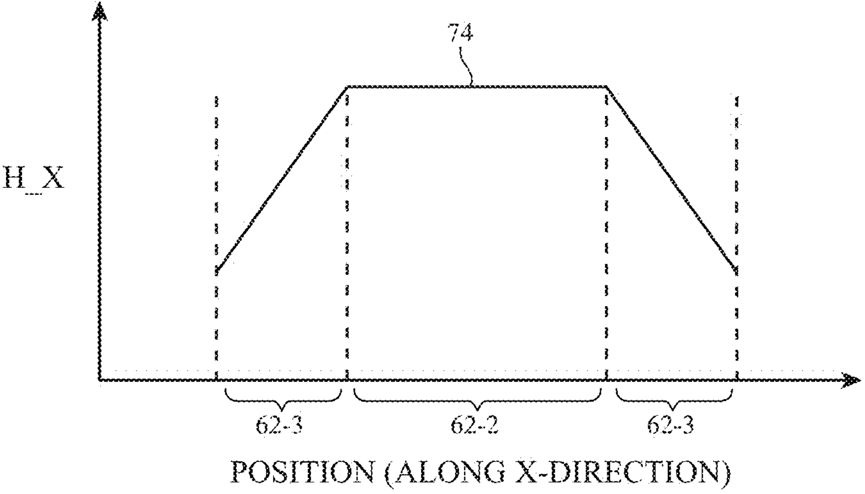
FIG. 11 is a graph of the width of slots as a function of position along the X-direction in accordance with some embodiments.

FIG. 11 shows how H_X may vary as a function of position along the X-direction. Varying H_X may be used instead of or in addition to the varying G_X of FIG. 10. As shown by profile 74 in FIG. 10, H_X is constant within hinge region 62-2. However, H_X varies gradually within each region 62-3. In particular, H_X is at a maximum at an edge of region 62-3 that is adjacent to hinge region 62-2. H_X then gradually decreases with increasing separation from the hinge region from the maximum magnitude to a minimum magnitude at an edge of region 62-3 that is opposite the edge adjacent to hinge region 62-2.

In other words, transition region 62-3 may have a first slot that is separated by a first distance (D_1) in the X-direction from hinge region 62-2 and has a first magnitude (H_X_1) for H_X. Transition region 62-3 may have a second slot that is separated by a second distance (D_2) in the X-direction from hinge region 62-2 and has a second magnitude (H_X_2) for H_X. Transition region 62-3 may have a third slot that is separated by a third distance (D_3) in the X-direction from hinge region 62-2 and has a third magnitude (H_X_3) for H_X. Transition region 62-3 may have a fourth slot that is separated by a fourth distance (D_4) in the X-direction from hinge region 62-2 and has a fourth magnitude (H_X_4) for H_X. When the first distance is less than the second distance, the second distance is less than the third distance, and the third distance is less than the fourth distance, then the first magnitude is greater than the second magnitude, the second magnitude is greater than the third magnitude, and the third magnitude is greater than the fourth magnitude (e.g., when D1<D2<D3<D4, then H_X_1>H_X_2>H_X_3>H_X_4).

Figure 12:
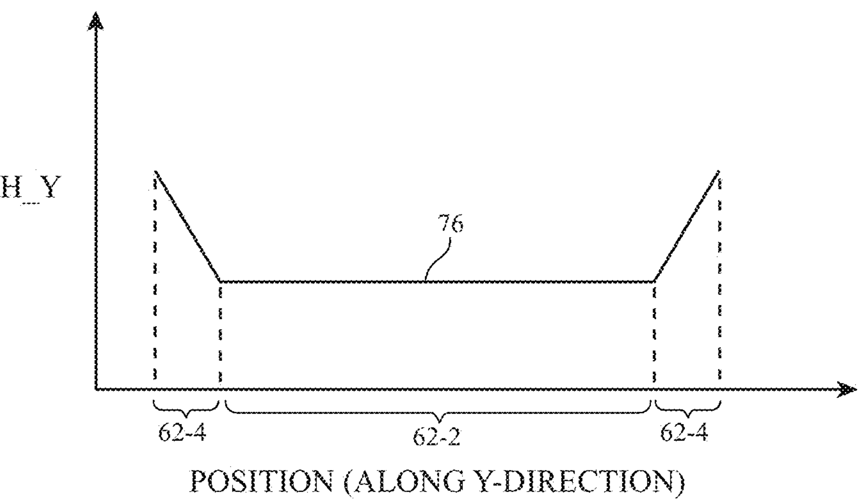
FIG. 12 is a graph of the length of slots as a function of position along the Y-direction in accordance with some embodiments.

FIG. 12 shows how H_Y may vary as a function of position along the Y-direction. As shown by profile 76 in FIG. 12, H_Y is constant within hinge region 62-2. However, H_Y varies gradually within each region 62-4. In particular, H_Y is at a minimum at an edge of region 62-4 that is adjacent to hinge region 62-2. H_Y then gradually increases with increasing separation from the hinge region from the minimum magnitude to a maximum magnitude at an edge of region 62-4 that is opposite the edge adjacent to hinge region 62-2.

In other words, transition region 62-3 may have a first slot that is separated by a first distance (D_1) in the Y-direction from hinge region 62-2 and has a first magnitude (H_Y_1) for H_Y. Transition region 62-3 may have a second slot that is separated by a second distance (D_2) in the Y-direction from hinge region 62-2 and has a second magnitude (H_Y_2) for H_Y. Transition region 62-3 may have a third slot that is separated by a third distance (D_3) in the Y-direction from hinge region 62-2 and has a third magnitude (H_Y_3) for H_Y. Transition region 62-3 may have a fourth slot that is separated by a fourth distance (D_4) in the Y-direction from hinge region 62-2 and has a fourth magnitude (H_Y_4) for H_Y. When the first distance is less than the second distance, the second distance is less than the third distance, and the third distance is less than the fourth distance, then the first magnitude is less than the second magnitude, the second magnitude is less than the third magnitude, and the third magnitude is less than the fourth magnitude (e.g., when D1<D2<D3<D4, then H_Y_1<H_Y_2<H_Y_3<H_Y_4).

Figure 13:
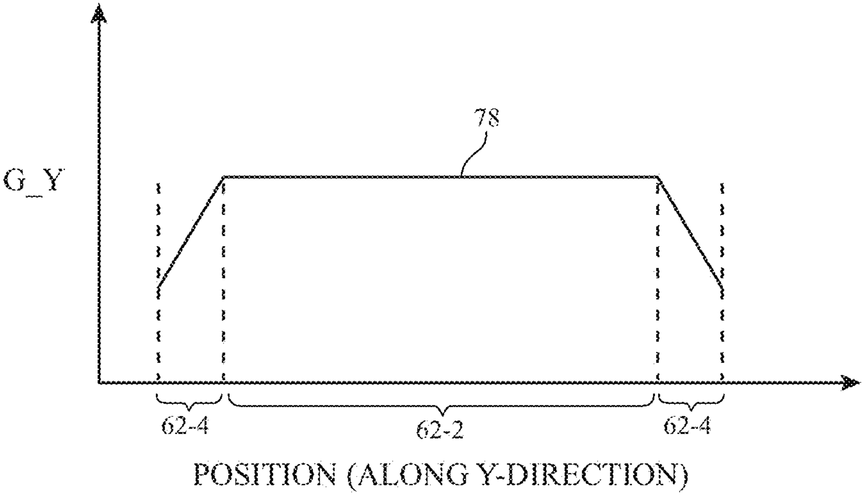
FIG. 13 is a graph of the gap between adjacent slots in the Y-direction as a function of position along the Y-direction in accordance with some embodiments.

FIG. 13 shows how G_Y may vary as a function of position along the Y-direction. Varying G_Y may be used instead of or in addition to the varying H_Y of FIG. 12. As shown by profile 78 in FIG. 13, G_Y is constant within hinge region 62-2. However, G_Y varies gradually within each region 62-4. In particular, G_Y is at a maximum at an edge of region 62-4 that is adjacent to hinge region 62-2. G_Y then gradually decreases with increasing separation from the hinge region from the maximum magnitude to a minimum magnitude at an edge of region 62-4 that is opposite the edge adjacent to hinge region 62-2.

In other words, edge region 62-3 may have a first pair of adjacent slots that are separated by a first distance (D_1) in the Y-direction from hinge region 62-2 and have a first magnitude (G_Y_1) for G_Y. Transition region 62-3 may have a second pair of adjacent slots that are separated by a second distance (D_2) in the Y-direction from hinge region 62-2 and have a second magnitude (G_Y_2) for G_Y. Transition region 62-3 may have a third pair of adjacent slots that are separated by a third distance (D_3) in the Y-direction from hinge region 62-2 and have a third magnitude (G_Y_3) for G_Y. Transition region 62-3 may have a fourth pair of adjacent slots that are separated by a fourth distance (D_4) in the Y-direction from hinge region 62-2 and have a fourth magnitude (G_Y_4) for G_Y. When the first distance is less than the second distance, the second distance is less than the third distance, and the third distance is less than the fourth distance, then the first magnitude is greater than the second magnitude, the second magnitude is greater than the third magnitude, and the third magnitude is greater than the fourth magnitude (e.g., when D1<D2<D3<D4, then G_Y_1>G_Y_2>G_Y_3>G_Y_4).

To summarize, the slots in portion 62B of layer 62 may have at least one property that varies along the X-direction in at least one region and at least one property that varies along the Y-direction in at least one region. As some examples, G_X or H_X may vary along the X-direction within regions 62-3 and, simultaneously, H_Y or G_Y may vary along the Y-direction within regions 62-4. Having variance in both the X-direction and the Y-direction in the slots in portion 62B may allow for strain non-uniformity across the display to be mitigated during folding operations.

Figure 14:
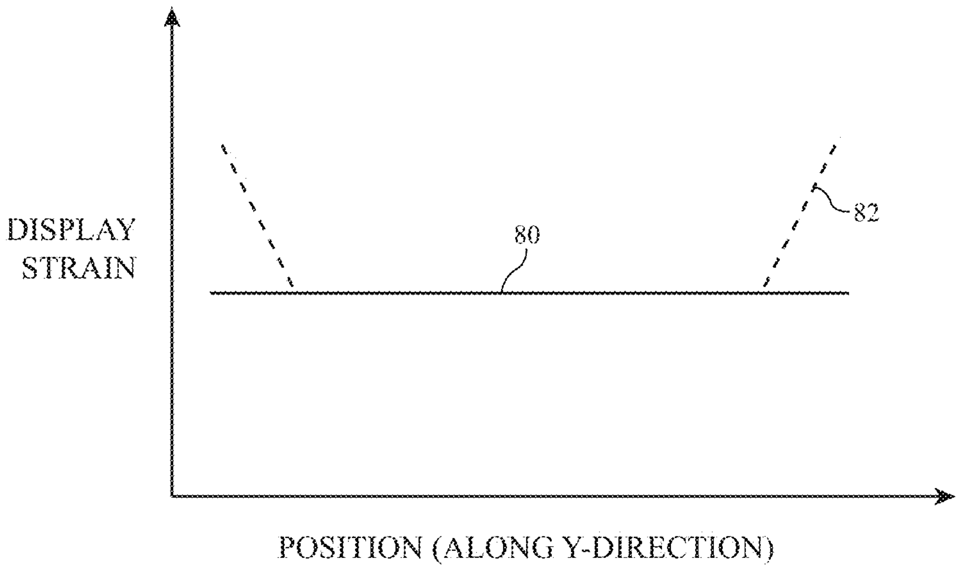
FIG. 14 is a graph of the strain on a flexible display as a function of position along the Y-direction in accordance with some embodiments.

FIG. 14 is a graph of display strain (e.g., strain on display 14 when the display is folded) as a function of position along the Y-direction. In particular, FIG. 14 shows the strain along the bend axis 22 within display portion 14B. Profile 82 shows the strain in an arrangement where H_X, H_Y, G_X, and G_Y are constant for slots across portion 62B. As shown, there may be an increase in strain at the edges of the display relative to the middle of the display within flexible display portion 14B. Profile 80 shows the strain in an arrangement where H_X, H_Y, G_X, and G_Y have both X-direction and Y-direction variance in portion 62B. As shown by profile 80, this arrangement causes the strain to be approximately uniform across the flexible display portion 14B.

In one specific arrangement for the slots, H_L may be 7 millimeters in regions 62-2 and 62-3 and may gradually increase from 7 millimeters to 9.5 millimeters within edge regions 62-4 (e.g., according to the profile of FIG. 12), H_W may be 0.2 millimeters in regions 62-2, 62-3, and 62-4, G_X may be 0.3 millimeters in regions 62-2 and 62-4 and may gradually increase from 0.3 millimeters to 2.0 millimeters within transition regions 62-3 (e.g., according to the profile of FIG. 10), and G_Y may be 0.4 millimeters in regions 62-2, 62-3, and 62-4. This arrangement may result in the uniform strain profile 80 of FIG. 14.

In addition to mitigating strain non-uniformity in flexible display 14, the arrangement for the slots of FIGS. 8-14 may desirably mitigate strain non-uniformity in other layers in the electronic device such as adhesive layers 64 and 66.

Figure 15:
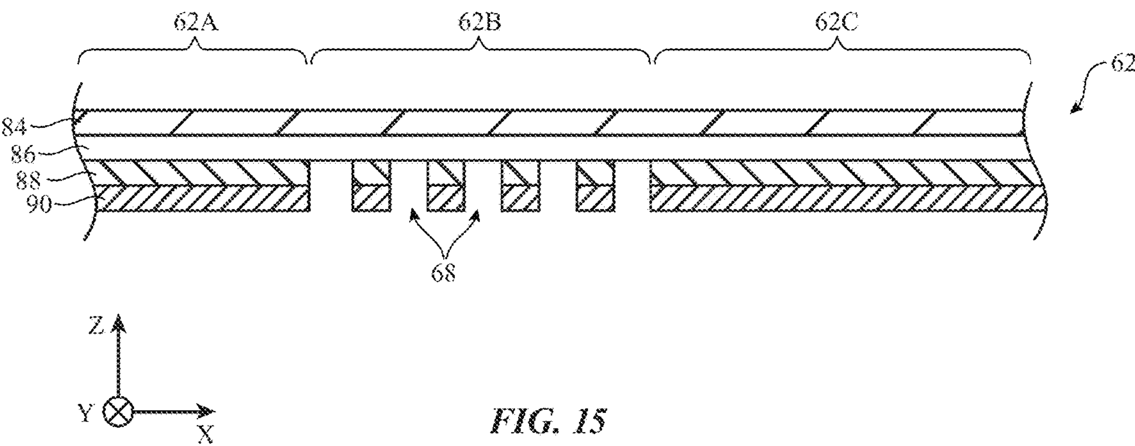
FIG. 15 is a cross-sectional side view of an illustrative bending layer with three carbon fiber reinforced polymer sublayers and slots that extend through two of the three carbon fiber reinforced polymer sublayers in accordance with some embodiments.

Layer 62 may be formed from any desired number of sublayers each having any desired material. In some cases, layer 62 may include a plurality of carbon fiber reinforced polymer sublayers (sometimes referred to as carbon fiber sublayers). Herein, sublayers may sometimes also be referred to as layers. FIG. 15 is a cross-sectional side view of a Kirigami layer 62 with three sublayers formed from carbon fiber reinforced polymer. As shown in FIG. 15, layer 62 includes carbon fiber reinforced polymer sublayers 84, 88, and 90. Sublayer 84 may be attached to display 14 using adhesive layer 66. Each carbon fiber reinforced polymer sublayer may include elongated carbon fibers that extend parallel to a given axis. In sublayers 84 and 90, the carbon fibers may extend in a first direction (e.g., parallel to the X-axis) whereas in sublayer 88 the carbon fibers may extend in a second, orthogonal direction (e.g., parallel to the Y-axis). These directions may be switched if desired. In other words, the carbon fibers in sublayer 88 are orthogonal to the carbon fibers in sublayers 84 and 90.

As shown in FIG. 15, one or more slots 68 may be formed in portion 62B of layer 62. Sublayer 84 may extend continuously across layer 62. In other words, the sublayer 84 is unchanged by slots 68 and has the same thickness in portion 62B as in portions 62A and 62C. In contrast, slots 68 are formed through the entire thickness of sublayers 88 and 90. Sublayers 88 and 90 have slots in portion 62B and do not have slots in portions 62A and 62C. The slots 68 are formed in sublayers 88 and 90 but not in sublayer 84.

An adhesive layer 86 is used to attach sublayer 84 to sublayer 88. Adhesive layer 86 may be a pressure sensitive adhesive layer or any other desired type of adhesive. Similar to sublayer 84, adhesive layer 86 extends continuously across layer 62. In other words, the adhesive layer 86 is unchanged by slots 68 and has the same thickness in portion 62B as in portions 62A and 62C.

To form layer 62 in FIG. 15, sublayers 88 and 90 may be laminated together and perforated with slots 68. The laminated sublayers 88 and 90 are then attached to continuous sublayer 84 using adhesive layer 86.

Layer 84 may have a thickness (in the Z-direction) of between 10 microns and 70 microns, between 30 microns and 50 microns, less than 100 microns, less than 70 microns, less than 50 microns, greater than 10 microns, greater than 30 microns, etc. Adhesive layer 86 may have a thickness (in the Z-direction) of between 5 microns and 50 microns, between 15 microns and 25 microns, less than 50 microns, less than 30 microns, less than 25 microns, greater than 5 microns, greater than 15 microns, etc. The combination of sublayers 88 and 90 may have a thickness (in the Z-direction) of between 100 microns and 200 microns, between 120 microns and 150 microns, less than 300 microns, less than 200 microns, less than 150 microns, greater than 50 microns, greater than 120 microns, etc. The total thickness of layer 62 may be less than 300 microns, less than 200 microns, less than 180 microns, etc.

Continuous carbon fiber reinforced polymer sublayer 84 may have a high thermal conductivity and may evenly distribute heat that is generated by electronic device 10. When the arrangement of FIG. 15 is used, a separate graphite heat spreading layer may be omitted from device 10 while still achieving satisfactory heat spreading within the device. The properties of sublayer 84 may be tuned to optimize the performance of layer 62.

Figure 16:
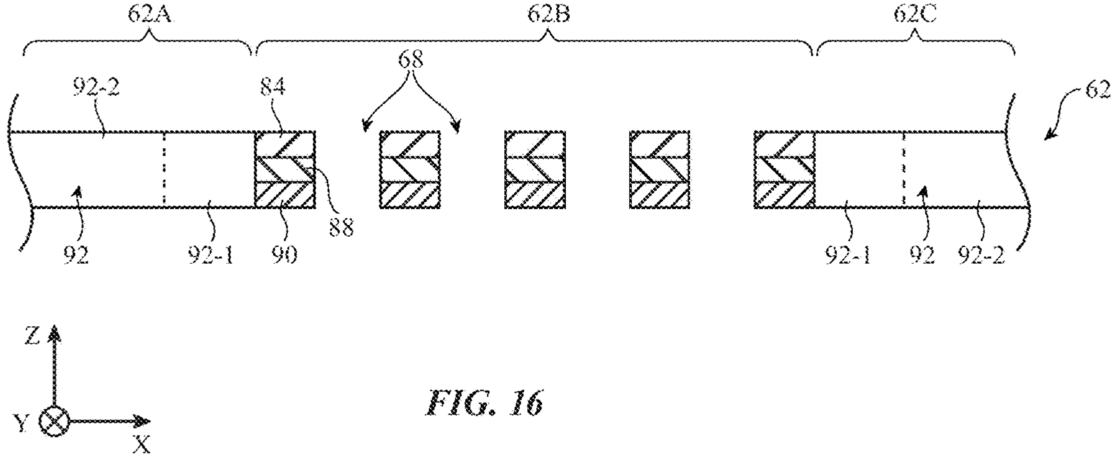
FIG. 16 is a cross-sectional side view of an illustrative bending layer with carbon fiber reinforced polymer sublayers in a bending region and plastic sublayers in other regions in accordance with some embodiments.

Carbon fiber may have a high strength and heat dissipation performance while being relatively lightweight. However, the cost of carbon fiber may be higher than desired in some situations. To mitigate the manufacturing cost for electronic device 10, the arrangement of FIG. 16 may be used. In FIG. 16, layer 62 includes carbon fiber reinforced polymer sublayers 84, 88, and 90. Each carbon fiber reinforced polymer sublayer may include elongated carbon fibers that extend parallel to a given axis. In sublayers 84 and 90, the carbon fibers may extend parallel to the X-axis whereas in sublayer 88 the carbon fibers may extend parallel to the Y-axis. In other words, the carbon fibers in sublayer 88 are orthogonal to the carbon fibers in sublayers 84 and 90. Carbon fiber reinforced polymer sublayers 84, 88, and 90 in FIG. 16 are all laminated together (without an intervening adhesive layer).

In the arrangement of FIG. 16, carbon fiber reinforced polymer sublayers 84, 88, and 90 are included in portion 62B (e.g., that is aligned with the bend axis) but not portions 62A and 62C. In portions 62A and 62C, a polymer material is used instead of the carbon fiber reinforced polymer sublayers. The polymer material is therefore used in portions 62A and 62C where flexibility is not as advantageous to device performance. In portion 62B, where flexibility is most advantageous to device performance, carbon fibers are used. The polymer layer 92 may be co-molded (sometimes referred to as overmolded) with the carbon fiber reinforced polymer sublayers to form a unitary layer with a first portion formed from carbon fiber reinforced polymer (in portion 62B) and additional portions (in portions 62A and 62C) formed from polymer (without any carbon fibers).

In some cases, the entire portion 62A may be formed from the same material in a single co-molding step. Similarly, the entire portion 62C may be formed from the same material in a single co-molding step.

Alternatively, for each one of portions 62A and 62C there may optionally be a first polymer portion 92-1 that is co-molded with the carbon fiber reinforced polymer sublayers. The co-molded portion 92-1 is then attached to a die-cut sheet 92-2. This may simplify the complexity of the co-molding process during manufacturing. When a co-molded portion 92-1 is attached to a separate sheet 92-2, portions 92-1 and 92-2 may be formed from the same material or from different materials.

Figure 17:
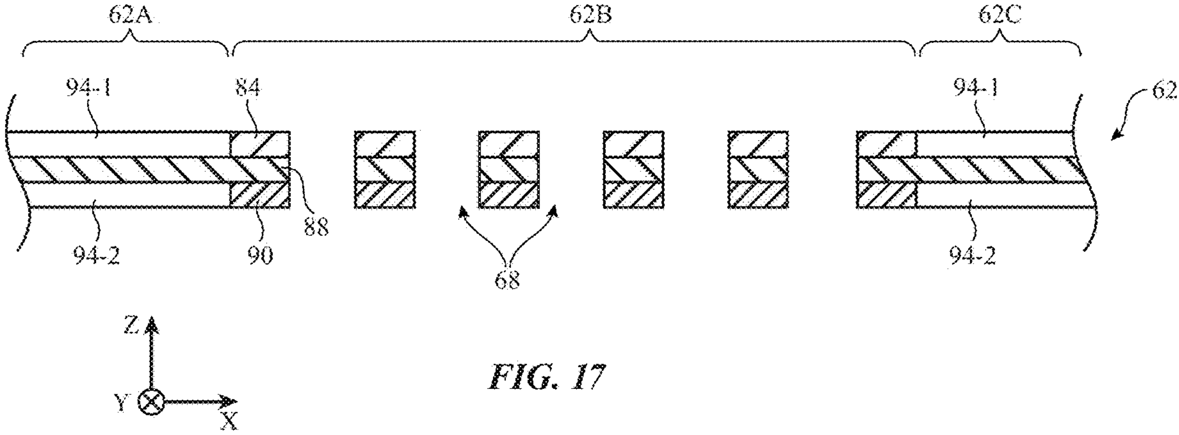
FIG. 17 is a cross-sectional side view of an illustrative bending layer with carbon fiber reinforced polymer sublayers in a bending region and both plastic and carbon fiber reinforced polymer sublayers in other regions in accordance with some embodiments.

FIG. 17 shows another possible arrangement where, in display portion 62B, layer 62 includes carbon fiber reinforced polymer sublayers 84, 88, and 90. Each carbon fiber reinforced polymer sublayer may include elongated carbon fibers that extend parallel to a given axis. In sublayers 84 and 90, the carbon fibers may extend parallel to the X-axis whereas in sublayer 88 the carbon fibers may extend parallel to the Y-axis. In other words, the carbon fibers in sublayer 88 are orthogonal to the carbon fibers in sublayers 84 and 90. Carbon fiber reinforced polymer sublayers 84, 88, and 90 in FIG. 17 are all laminated together (without an intervening adhesive layer).

In the arrangement of FIG. 17, sublayer 88 extends across layer 62. In other words, the sublayer 88 is included in portions 62A and 62C as well as portion 62B. In contrast, sublayers 84 and 90 may be included in portion 62B (e.g., that is aligned with the bend axis) but not portions 62A and 62C. In portions 62A and 62C, a polymer material is used instead of the carbon fiber reinforced polymer sublayers 84 and 90. The polymer layers 94-1 and 94-2 may be co-molded (sometimes referred to as overmolded) with the carbon fiber reinforced polymer sublayers such that, in display portions 62A and 62C, carbon fiber reinforced polymer sublayer 88 is interposed between polymer layers 94-1 and 94-2.

Figure 18:
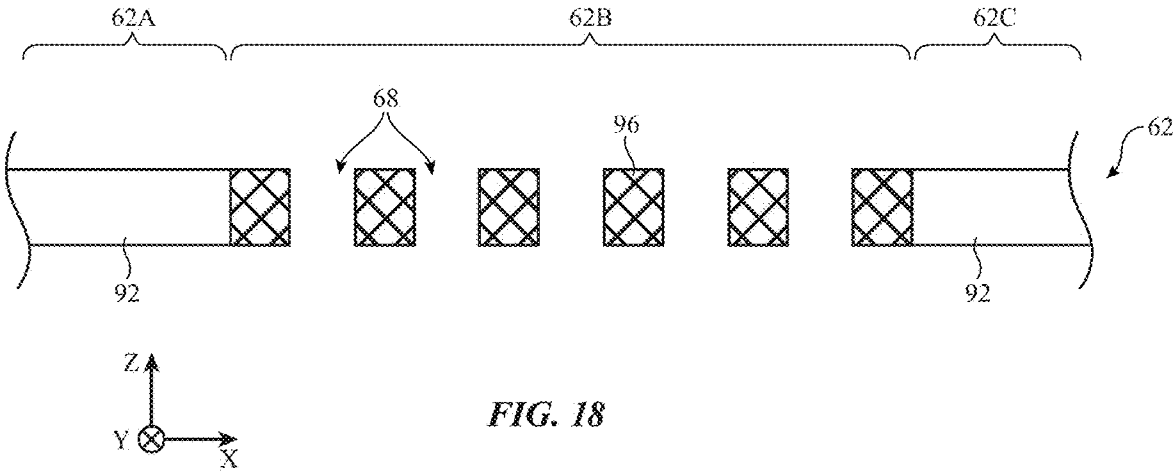
FIG. 18 is a cross-sectional side view of an illustrative bending layer with a stainless steel sublayer in a bending region and plastic sublayers in other regions in accordance with some embodiments.

In another possible arrangement, shown in FIG. 18, layer 62 may include a stainless steel (SUS) sublayer 96 with slots 68. To reduce the weight of layer 62, stainless steel sublayer 96 may be included in portion 62B (e.g., that is aligned with the bend axis) but not portions 62A and 62C. In portions 62A and 62C, a polymer material is used instead of the stainless steel sublayer. The polymer layer 92 may be co-molded (sometimes referred to as overmolded) with the carbon fiber reinforced polymer sublayers to form a unitary layer with a first portion formed from stainless steel (in portion 62B) and additional portions (in portions 62A and 62C) formed from polymer.

It is noted that in FIGS. 17 and 18, as described in connection with FIG. 16, only a subset of portions 62A and 62C may be co-molded if desired (with the portions 62A and 62C also including a die-cut sheet of polymer attached to the co-molded polymer).

In the arrangements of FIGS. 16-18, interlocking features may be used to ensure secure attachment between any desired components (e.g., between carbon fiber reinforced polymer sublayers 84, 88, and 90 and co-molded polymer portion 92-1 in FIG. 16, between co-molded polymer portion 92-1 and die cut polymer portion 92-2 in FIG. 16, between carbon fiber reinforced polymer sublayer 84 and polymer portion 94-1 in FIG. 17, between carbon fiber reinforced polymer sublayer 90 and polymer portion 94-2 in FIG. 17, and/or between stainless steel sublayer 96 and polymer portion 92 in FIG. 18).

Figure 19:
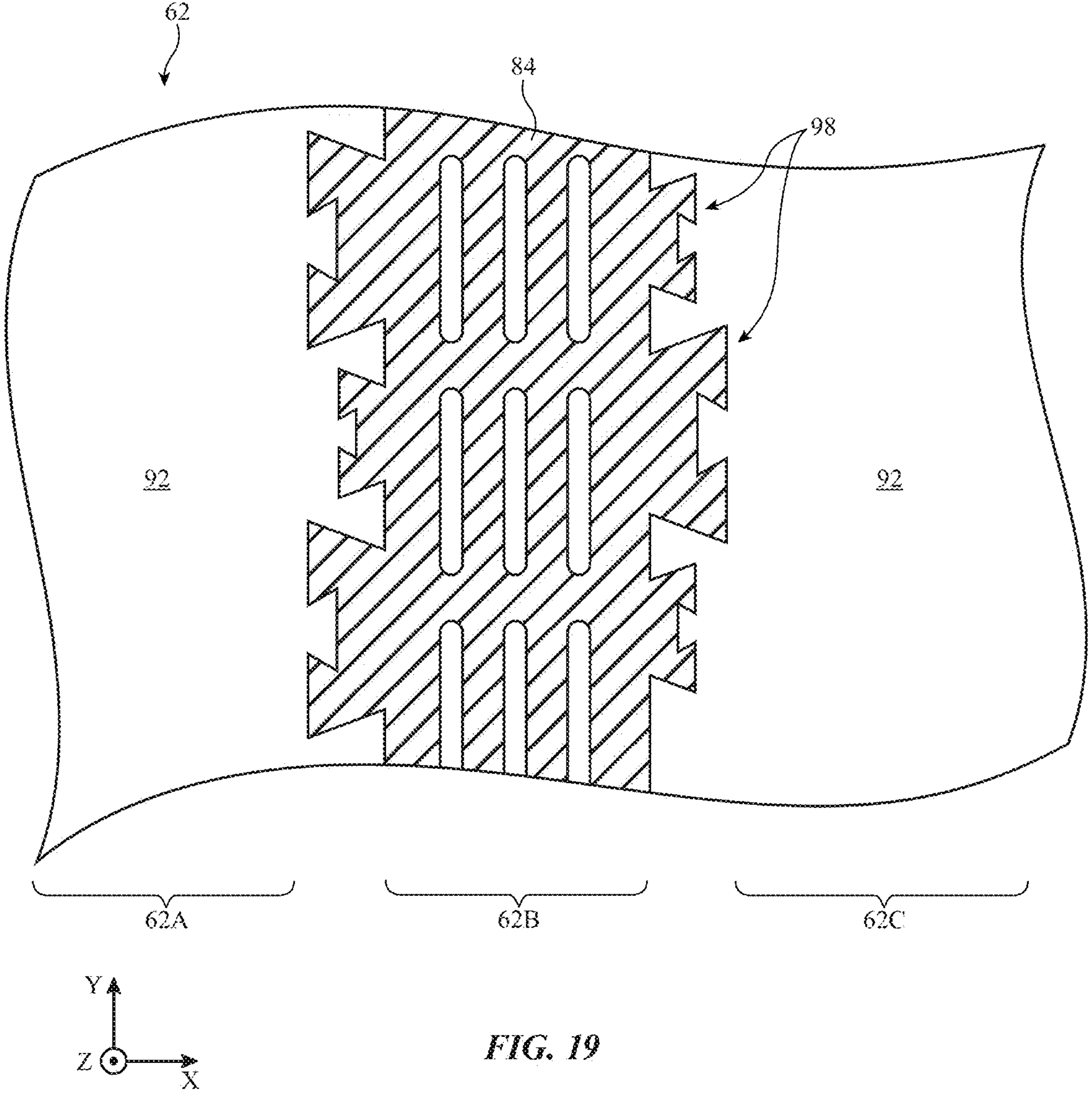
FIG. 19 is a top view of an illustrative bending layer showing how interlocking features may be formed between adjacent sublayers in accordance with some embodiments.

FIG. 19 is a top view of an illustrative layer 62 with interlocking features between different sublayers. As shown, carbon fiber reinforced polymer sublayer 84 in display portion 62B is interposed between polymer portions 92 from display portions 62A and 62C. On each side of carbon fiber reinforced polymer sublayer 84, interlocking features 98 are included. The interlocking features 98 include one or more protrusions and recesses with sloped sides that are non-parallel and non-orthogonal to the X-axis and Y-axis. In the arrangement of FIG. 19, each interlocking feature includes a trapezoidal protrusion that extends away from display portion 62B. Each trapezoidal protrusion has a corresponding trapezoidal recess (e.g., in the non-central edge of the trapezoidal protrusion). The footprint of the interlocking features 98 helps ensure a secure attachment between sublayers 84 and 92. In general, interlocking features of this type may be used between any two sublayers that are adjacent within the XY-plane (e.g., sublayers 88 and 92, sublayers 92-1 and 92-2, sublayers 90 and 92, sublayers 84 and 94, sublayers 90 and 94, sublayers 96 and 92, etc.).

The interlocking features may have varying sizes to mitigate artifacts at the transition area between the different sublayers. A first interlocking feature may have a first size and a second interlocking feature may have a second size that is different than the first size. Along a single interface between different sublayers, there may be interlocking features of at least two unique sizes, at least three unique sizes, at least six unique sizes, at least ten unique sizes, at least twenty unique sizes, etc. The sizes of the interlocking features may vary randomly or according to a repeating pattern.

Figure 20:
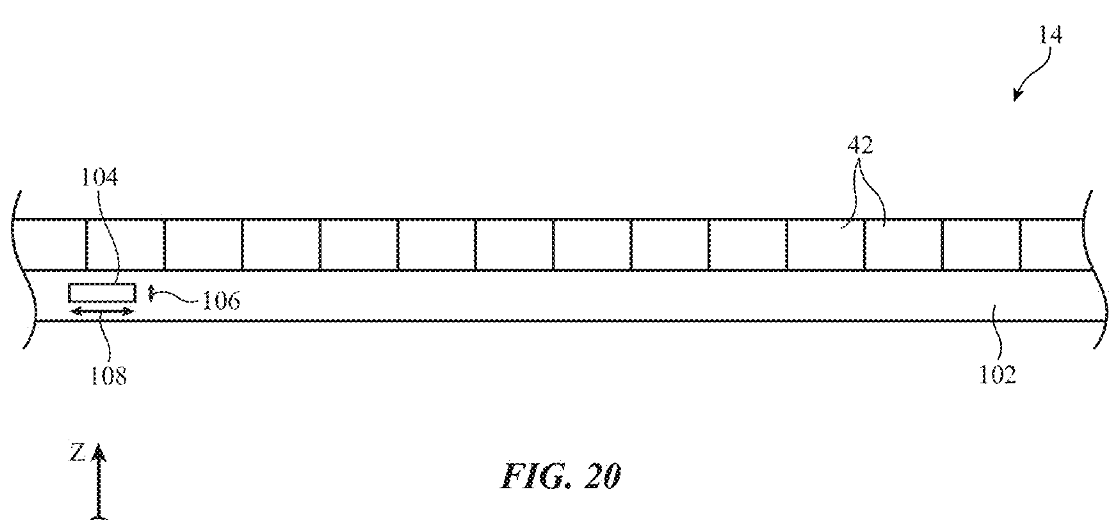
FIG. 20 is a cross-sectional side view of an illustrative display showing how a strain gauge may be incorporated into a thin-film transistor circuitry layer for a flexible display in accordance with some embodiments.

To detect folding and unfolding of display 14 and/or electronic device 10, the electronic device may include one or more strain gauge sensors. FIG. 20 is a cross-sectional side view of an illustrative display with pixels 42 formed on a thin-film transistor circuitry layer 102. Thin-film transistor circuitry layer 102 may include one or more transistors (e.g., transistors 28) that control the emission of light by light-emitting diodes in pixels 42. The thin-film transistor circuitry layer 102 may include metal traces, transistors, and one or more dielectric layers that isolate the conductive components.

Thin-film transistor circuitry layer 102 (sometimes referred to as thin-film transistor layer 102, circuitry layer 102, etc.) may include a strain gauge 104 (sometimes referred to as strain sensor 104, resistive sensor 104, sensor 104, etc.). Forming strain gauge 104 within thin-film transistor circuitry layer 102 may be advantageous as the manufacturing steps used to produce the other components in the thin-film transistor circuitry layer may be used to form the strain gauge. In other words, metal components for the strain gauge may be deposited during a single deposition step that shares a mask with other traces/components of the thin-film transistor circuitry layer (e.g., data lines, gate lines, source-drain terminals for a transistor, a gate for a transistor, power supply lines, other signal lines, etc.). The strain gauge may be formed on an upper surface of the thin-film transistor circuitry layer or may be embedded within at least two dielectric layers of the thin-film transistor circuitry layer.

Figure 21:
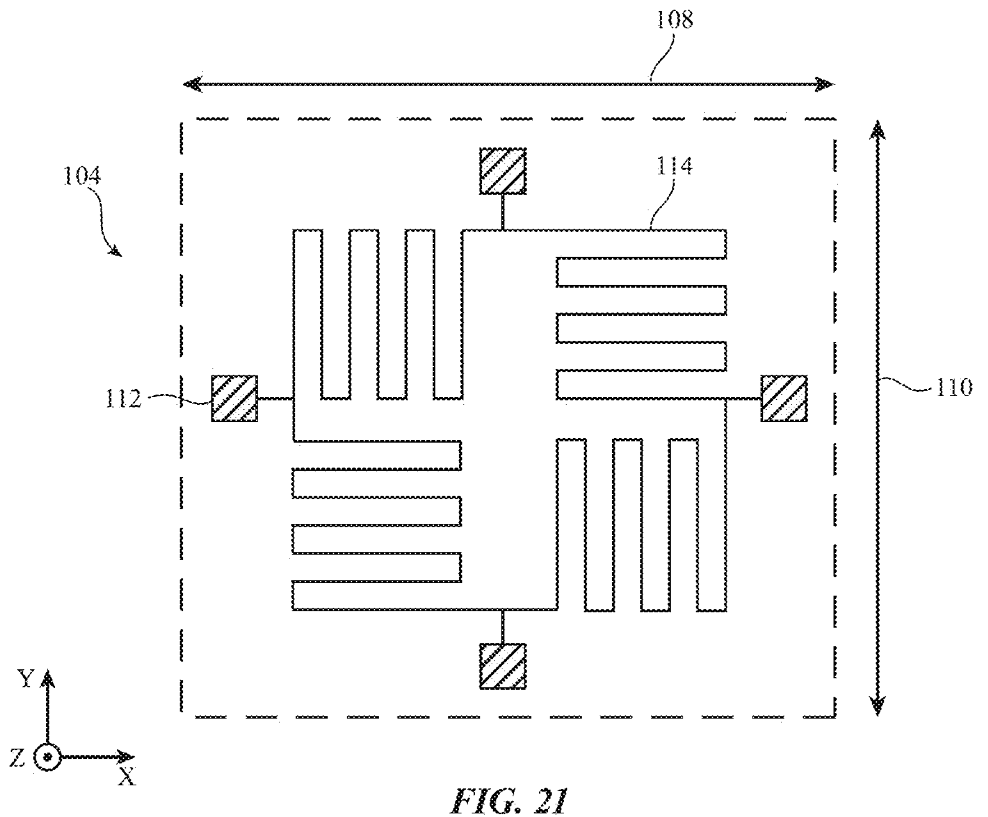
FIG. 21 is a top view of an illustrative strain gauge in accordance with some embodiments.

FIG. 21 is a top view of an illustrative strain gauge 104. As shown, the strain gauge may be a Wheatstone bridge with four terminals 112 and intervening meandering traces 114. The traces 114 between each pair of adjacent terminals 112 may include multiple segments that are parallel to the X-axis and multiple segments that are parallel to the Y-axis. The metal traces 114 and metal terminals 112 may be formed on a dielectric layer in thin-film transistor circuitry layer 102. When flexible display 14 is bent, the resistance of the traces in strain gauge 104 within thin-film transistor circuitry layer 102 changes. The change of the resistance may be measured and used to determine the strain on the strain gauge.

The strain gauge may have a first dimension 108 parallel to the X-axis, a second dimension 110 parallel to the Y-axis, and a third dimension 106 parallel to the Z-axis. Dimension 108 may be less than 1 millimeter, less than 0.6 millimeters, less than 0.4 millimeters, etc. Dimension 110 may be less than 1 millimeter, less than 0.6 millimeters, less than 0.4 millimeters, etc. Dimension 106 may be less than 1 micron, less than 0.5 microns, less than 0.2 microns, etc. In one possible arrangement dimension 106 is 0.14 microns, dimension 108 is 0.38 millimeters, and dimension 110 is 0.38 millimeters.

Figure 22:
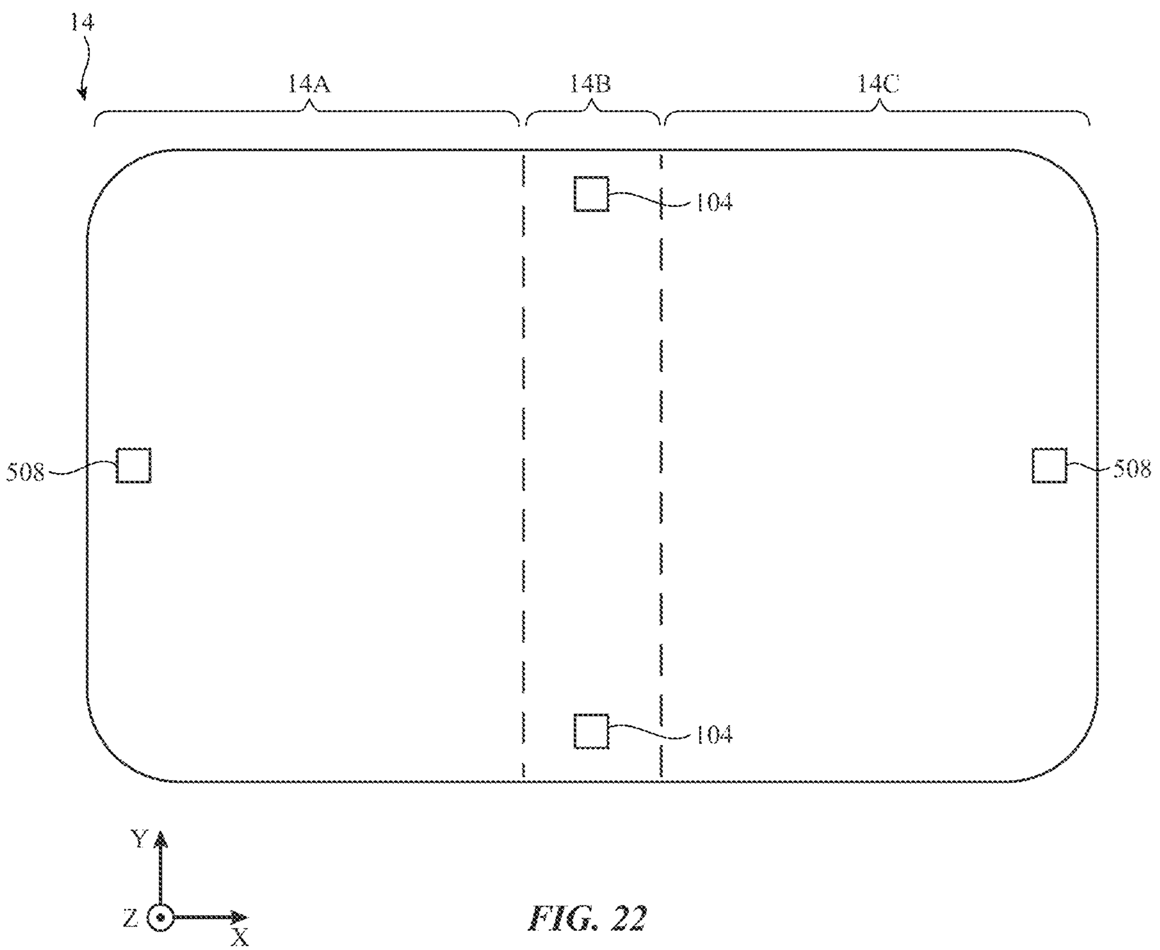
FIG. 22 is a top view of an illustrative flexible display with two strain gauges aligned with a bend axis in accordance with some embodiments.

FIG. 22 is a top view showing how one or more strain gauges may be positioned on display 14. As shown in FIG. 22, the strain gauge(s) may be positioned in flexible portion 14B of the display that is bent during folding and unfolding of the display. This positioning enables the strain gauge(s) to precisely detect the angle of display portion 14A relative to display portion 14C (as the angle may be a function of the strain detected by the strain gauge).

One strain gauge may be sufficient to measure the strain on display 14 and detect folding and unfolding of the display. However, as shown in FIG. 22 an additional strain gauge may be included to improve precision and provide redundancy in case one of the strain gauges malfunctions.

One or more sensors for gathering data on device position and motion may also be included in display 14. As shown in FIG. 22, a first motion sensor 508 may be positioned on display portion 14A and a second motion sensor 508 may be positioned on display portion 14C. The motion sensors 508 may be inertial measurement units that include accelerometers, compasses, and/or gyroscopes, as one example. Motion sensors 508 may sometimes simply be referred to as inertial measurement units 508 or accelerometers 508.

Including motion sensors 508 in display 14 may provide additional sensor data that may be used (in combination with sensor data from strain gauge(s) 104) to determine orientation and angle between display portions 14A and 14C.

Figure 23:
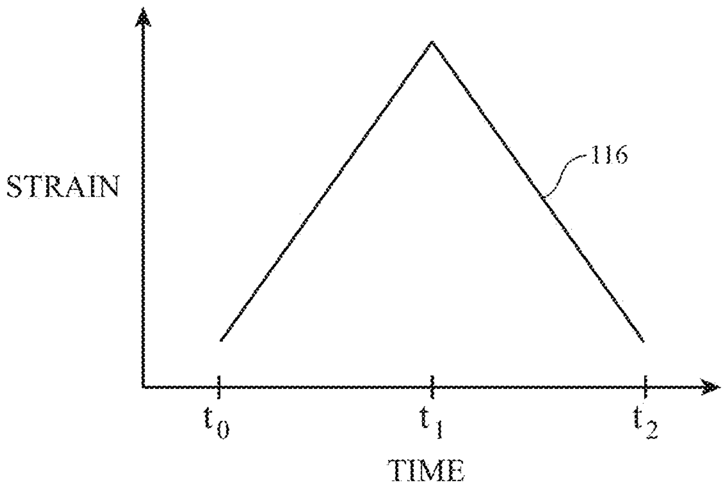
FIG. 23 is a graph of strain over time as measured by an illustrative strain gauge for a flexible display in accordance with some embodiments.

FIG. 23 is a graph showing strain over time sensed by a strain gauge 104 in FIG. 22 while electronic device 10 (and display 14) is folded and then unfolded. At $t_0$, the display may be in a planar, unfolded state (e.g., as in FIG. 1). In other words, display portions 14A, 14B, and 14C are all coplanar. Between $t_0$ and $t_1$, display 14 is bent (folded) into a folded state (e.g., as shown in FIG. 4). As shown by profile 116, the strain detected by strain gauge 104 gradually increases between to and $t_1$, reaching a maximum value at $t_1$ when the display is folded. Between $t_1$ and $t_2$, display 14 is bent (unfolded) into the planar, unfolded state (e.g., as in FIG. 1). As shown by profile 116, the strain detected by strain gauge 104 gradually decreases between $t_1$ and $t_2$, reaching the minimum value at $t_2$ when the display is unfolded.

The magnitude of strain detected by the strain gauge may therefore be used to detect the angle of display portion 14A relative to display portion 14C. The angle of display portion 14A relative to display portion 14C indicates if the display is in the unfolded state, in the folded state, or at an intermediate angle between the folded state and the unfolded state.

The strain gauge may have a high resolution (e.g., 0.0005% strain) and a high sampling rate (e.g., more than 1 kHz, more than 10 kHz, more than 20 kHz, 20 kHz, less than 50 kHz, etc.).

The strain gauge may be able to detect the speed at which the display is folded or unfolded. Control circuitry 50 may determine the duration of time for a change between the folded state and the unfolded state using the strain gauge data. In some situations, it may be desirable to fold and/or unfold the display at a speed that is below a given threshold. For example, in low temperature conditions, quickly folding or unfolding the display may risk damage to one or more components of the electronic device (e.g., thin-film transistor circuitry in layer 102). When control circuitry 50 determines that a speed for folding or unfolding the display is greater than a threshold (sometimes referred to as a maximum recommended speed) associated with the present temperature conditions, the electronic device may output a user notification to inform the user.

Data from strain gauge(s) 104 may also be used to estimate the temperature of the display. Components within the electronic device such as adhesive layer 64 and/or adhesive layer 66 may have different properties depending on the temperature of electronic device 10. As one specific example, the strain (in units of %) when the display is folded may depend on temperature. Consider an example where the display is folded at a first time. The strain detected by the strain gauge may peak when the display is initially folded (at the first time). The strain detected by the strain gauge may subsequently gradually decrease over time (e.g., over one or more minutes, over ten or more minutes, over thirty or more minutes, etc.). At hotter temperatures, the strain may decrease more quickly and to a lower magnitude than at colder temperatures. The rate at which the detected strain decreases in this scenario is therefore indicative of the temperature of the display.

As an other example, the strain relaxation rate (in units of %/min) may vary during bending events. The strain relaxation rate may vary over a duration of time that is less than 3 seconds, less than 2 seconds, less than 1 second, etc. The strain relaxation rate may have different magnitudes depending on temperature. The strain relaxation rate is therefore indicative of the temperature of the display.

Figure 24:
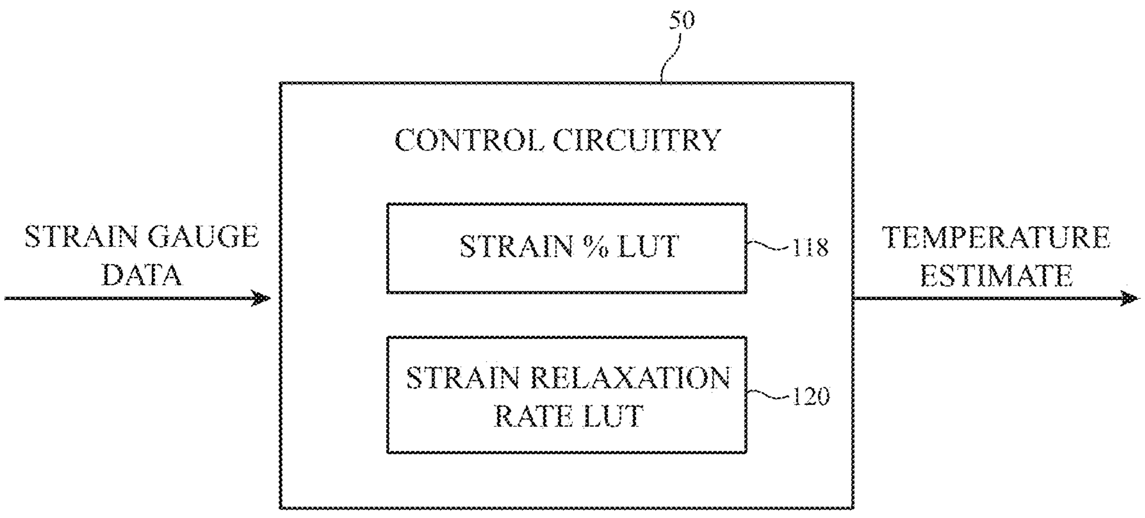
FIG. 24 is a schematic diagram of control circuitry that estimates temperature for the flexible display based on strain gauge data in accordance with some embodiments.

FIG. 24 is a schematic diagram of illustrative control circuitry that may estimate a temperature of the flexible display based on strain gauge data. As shown, the control circuitry 50 may receive strain gauge data from one or more strain gauges 104. The control circuitry may select the strain gauge data from only one strain gauge to use for subsequent temperature estimation, may average the strain gauge data from multiple strain gauges to use for subsequent temperature estimation, etc.

The control circuitry may include one or more lookup tables (LUTs) such as strain percentage lookup table 118 and strain relaxation rate lookup table 120.

As a first example, the strain as measured by the strain gauges (e.g., after a given period of time from a folding or unfolding event) may have an associated temperature in the strain percentage lookup table 118. The associated temperature may be output as the temperature estimate by control circuitry 50.

As another example, the strain relaxation rate as measured by the strain gauge data may have an associated temperature in the strain relaxation rate lookup table 120. The associated temperature may be output as the temperature estimate by control circuitry 50.

In some cases, only the strain percentage lookup table is used to estimate temperature. In other cases, only the strain relaxation rate lookup table is used to estimate temperature. In other cases, both the strain percentage lookup table and the strain relaxation rate lookup table are used to determine a single temperature estimate. For example, the temperature estimate from table 118 and the temperature estimate from table 120 may be averaged to obtain the output temperature estimate.

Figure 25:
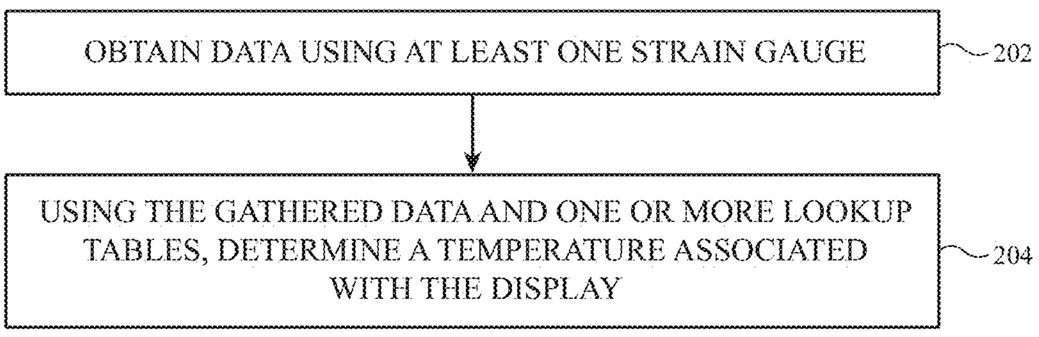
FIG. 25 is a flowchart of an illustrative method for determining temperature based on strain gauge data in accordance with some embodiments.

FIG. 25 is a flowchart of illustrative method steps for determining a temperature associated with display 14. During the operations of block 202, the electronic device may obtain data using at least one strain gauge such as strain gauge 104. The example of obtaining the data using a strain gauge is merely illustrative and one or more other sensors may be used instead of or in addition to a strain gauge if desired.

The operations of block 202 may include obtaining data with one or more motion sensors such as motion sensors 508 if desired.

Next, at block 204, the electronic device (e.g., control circuitry 50) may use the gathered data from step 202 and one or more lookup tables (e.g., tables 118 and 120 in FIG. 24) to determine a temperature associated with the display. The example of determining the temperature using lookup tables is merely illustrative. The control circuitry may alternatively store a function that outputs a temperature estimate based on input strain data.

Figure 26:
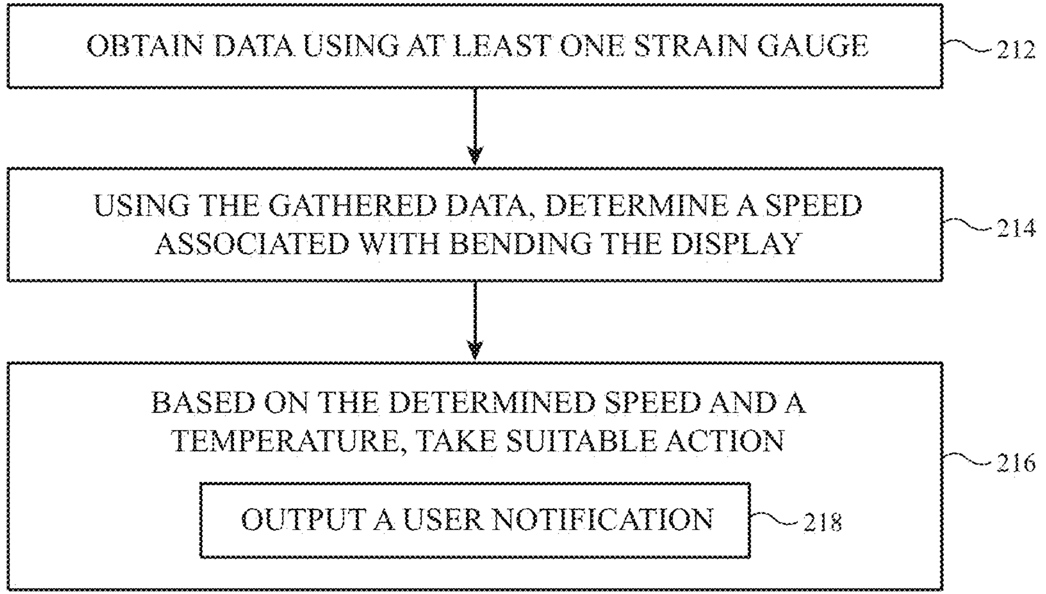
FIG. 26 is a flowchart of an illustrative method for outputting a notification based on temperature and a speed associated with bending the display in accordance with some embodiments.

FIG. 26 is a flowchart of illustrative method steps for operating a display with at least one strain gauge. At block 212, the electronic device may obtain data using at least one strain gauge such as strain gauge 104. The example of obtaining the data using a strain gauge is merely illustrative and one or more other sensors may be used instead of or in addition to a strain gauge if desired.

The operations of block 212 may include obtaining data with one or more motion sensors such as motion sensors 508 if desired.

At step 214, control circuitry 50 may determine a speed associated with bending the display using the data gathered at block 212. The strain gauge data from step 212 may show an increase or decrease in strain indicative of the display being folded or unfolded (as discussed in connection with FIG. 23). The duration of time during which the folding or unfolding occurs may indicate the speed at which the display was folded or unfolded.

Next, at step 216, control circuitry 50 may take suitable action based on the determined speed from block 214 and a temperature associated with the flexible display. Electronic device 10 may have one or more temperature sensors that are used to determine the temperature of the flexible display. Alternatively, data from the strain gauge(s) may be used to estimate temperature as discussed in connection with FIGS. 24 and 25.

In general, folding or unfolding the flexible display when temperatures are low may risk damaging components in the display. Therefore, the recommended maximum speed for folding and unfolding the display may be a function of temperature. Control circuitry 50 may optionally store a lookup table that has recommended maximum speeds (for folding/unfolding) associated with various temperatures. For example, a first temperature may have a first recommended maximum speed for folding the flexible display and a second temperature may have a second recommended maximum speed for folding the flexible display. Folding the flexible display at a speed that is greater (faster) than the recommended maximum speed may risk damaging components of the flexible display. When the first temperature is lower (colder) than the second temperature, the first recommended maximum speed may be lower (slower) than the second recommended maximum speed. In other words, at lower temperatures the maximum recommended folding (or unfolding) speed may be lower than at higher temperatures.

Electronic device 10 may take any desired action at block 216 based on the determined speed and temperature. When the determined speed is less than the maximum recommended folding speed for the current temperature, the electronic device may optionally take no action. When the determined speed is greater than the maximum recommended folding speed for the current temperature, the electronic device may take appropriate action such as outputting a user notification at block 218.

The user notification output at step 218 may be output using visual feedback (e.g., by display 14 or other light-emitting component), audio feedback (e.g., using a speaker), or haptic feedback (e.g., using a haptic output component such as a vibrating motor). The notification may indicate to the user that the speed of the folding or unfolding event was greater than the maximum recommended folding speed for the current temperature, may indicate to the user that the flexible display should be folded/unfolded at lower speeds to avoid damage, etc.

Figure 27:
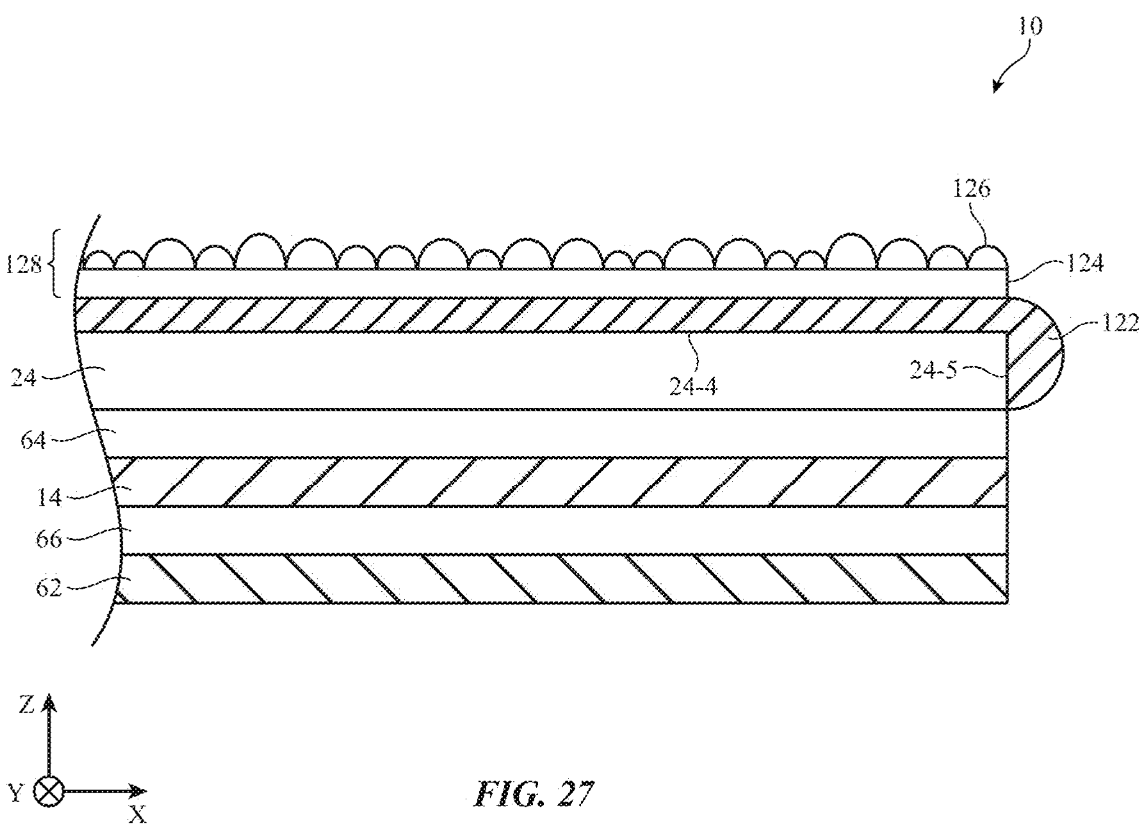
FIG. 27 is a cross-sectional side view of an illustrative electronic device with a matte film that is formed over a display cover layer in accordance with some embodiments.

FIG. 27 is a cross-sectional side view of an illustrative electronic device with a flexible display. Similar to as discussed in connection with FIG. 6, the electronic device 10 includes a display 14 that is overlapped by display cover layer 24. Display cover layer 24 is attached to display 14 with adhesive layer 64. Electronic device 10 may also include a layer 62 that is attached to display 14 using adhesive layer 66. Display 14 may be interposed between display cover layer 24 and layer 62.

FIG. 27 further shows how an adhesive layer 122 (sometimes referred to as adhesive 122, adhesive resin 122, optically clear adhesive 122, etc.) may be formed over the upper surface and side surfaces of display cover layer 24. The adhesive layer 122 may be formed from a polymer material or any other desired material. Adhesive 122 may be an optically clear adhesive with a transparency that is greater than 80%, greater than 90%, greater than 95%, greater than 99%, etc.

Adhesive 122 conforms to and is in direct contact with an upper surface 24-U of display cover layer 24. The adhesive 122 may directly contact all of the upper surface 24-U. Additionally, adhesive 122 conforms to and is in direct contact with a side surface 24-S of display cover layer 24. Side surface 24-S may extend around the perimeter of display cover layer 24 (e.g., around a rectangular perimeter). The display cover layer may be referred to as having a continuous side surface that extends around the entire perimeter or may be referred to as having multiple side-surfaces that each extend along one edge of the perimeter. The adhesive 122 may directly contact all of the side surface 24-S.

Display cover layer 24 may be relatively thin (e.g., with a thickness that is less than 200 microns, less than 100 microns, less than 50 microns, less than 30 microns, greater than 10 microns, greater than 20 microns, greater than 50 microns, between 20 microns and 90 microns, between 10 microns and 200 microns, etc.). Covering the side-surfaces of display cover layer 24 with adhesive layer 122 may prevent cracking in the display cover layer 24.

FIG. 27 also shows how a matte film 128 may be formed over the display cover layer. The matte film 128 may include a polymer substrate 124 that is attached to the display cover layer using adhesive 122. Substrate 124 may have a thickness that is less than 100 microns, less than 50 microns, less than 30 microns, greater than 20 microns, greater than 50 microns, between 20 microns and 80 microns, etc. Polymer substrate 124 may have a transparency that is greater than 80%, greater than 90%, greater than 95%, greater than 99%, etc.

The matte film 128 further includes patterned features such as microlenses 126 on an upper surface of substrate 124. The microlenses 126 may increase the diffuse reflection of the upper surface of electronic device 10. The diffuse reflection of matte film 128 may be greater than 40%, greater than 50%, greater than 60%, less than 70%, less than 60%, between 50% and 70%, etc.

In addition to providing the upper surface of the electronic device with a matte appearance, microlenses 126 may be patterned to reduce friction of the upper surface of the electronic device. There may be one or more microlenses with different sizes. For example, a first microlens may have a first diameter (e.g., within the XY-plane) whereas a second microlens may have a second diameter that is different than the first diameter. Instead or in addition, a first microlens may have a first thickness (e.g., in the Z-direction) whereas a second microlens may have a second thickness that is different than the first thickness. Reducing the friction of the upper surface may improve the user experience when the user touches the upper surface of the electronic device.

Figure 28:
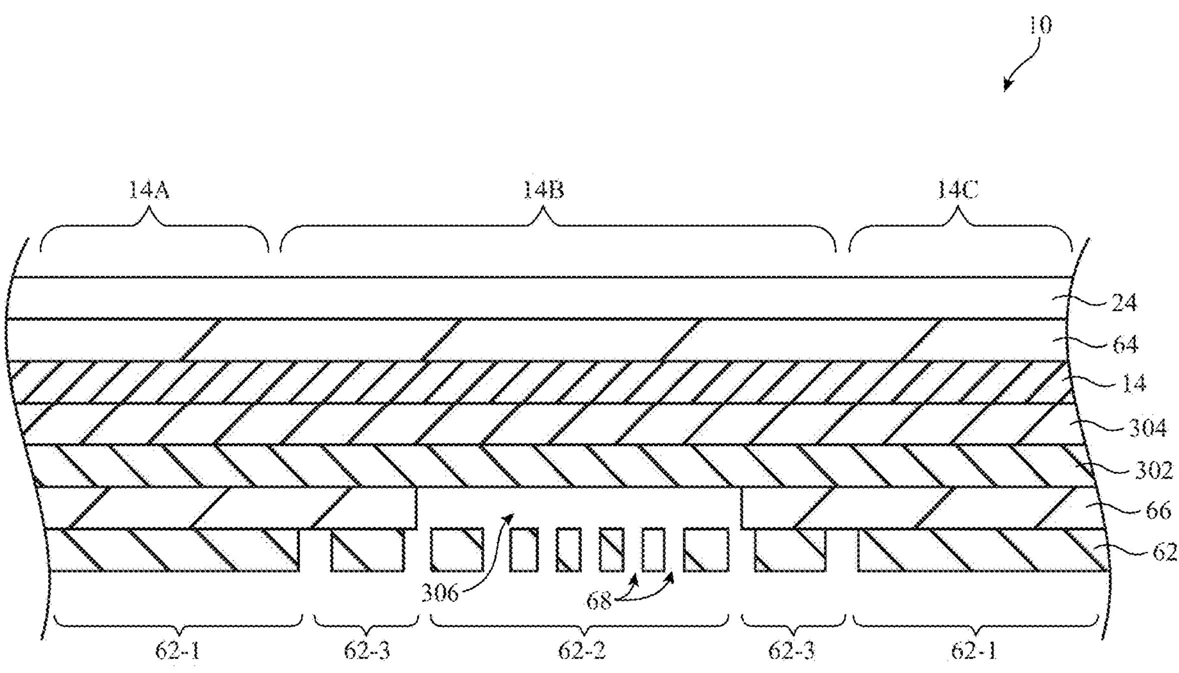
FIG. 28 is a cross-sectional side view of an illustrative electronic device with a flexible display, a display cover layer, a layer with slots, and an adhesive layer having a cutout over the slots in accordance with some embodiments.

The cross-section shown in FIG. 6 is merely illustrative. As shown in FIG. 28, the electronic device may include an additional stainless steel plate and/or a cutout in an adhesive layer. FIG. 28 is a cross-sectional side view of an illustrative electronic device with a flexible display. FIG. 28 shows flexible display 14 with portions 14A and 14C that may be rigid or flexible as well as flexible portion 14B. As shown in FIG. 28, display 14 is overlapped by a display cover layer 24. Display cover layer 24 is attached to display 14 with adhesive layer 64. Adhesive layer 64 may be formed from pressure sensitive adhesive or any other desired type of adhesive.

As previously shown and discussed, electronic device 10 may include a layer 62 that is attached to display 14 using adhesive layer 66. Adhesive layer 66 may be formed from pressure sensitive adhesive or any other desired type of adhesive.

In FIG. 28, an additional stainless steel layer 302 may be interposed between bending layer 62 and display 14. Adhesive layer 304 is interposed between stainless steel layer 302 and display 14. Adhesive layer 304 may be formed from pressure sensitive adhesive or any other desired type of adhesive. Display 14 may be interposed between display cover layer 24 and stainless steel layer 302.

FIG. 28 additionally shows how adhesive layer 66 may have a cutout 306. Without cutout 306, a perceptible crease in adhesive layer 66 may become visible over time as electronic device 10 is repeatedly bent along flexible portion 14B. When adhesive layer 66 is selectively removed in cutout region 306 (as in FIG. 28), the crease in adhesive layer 66 is no longer visible.

The footprint of cutout region 306 may completely or partially overlap hinge region 62-2 and edge regions 62-4 of bending layer 62 in flexible display portion 14B. The footprint of cutout region 306 may completely overlap transition regions 62-3, may partially overlap transition regions 62-3, or may not overlap transition regions 62-3. The footprint of cutout region 306 may not overlap rigid regions 62-1 of bending layer 62.

Figure 29:
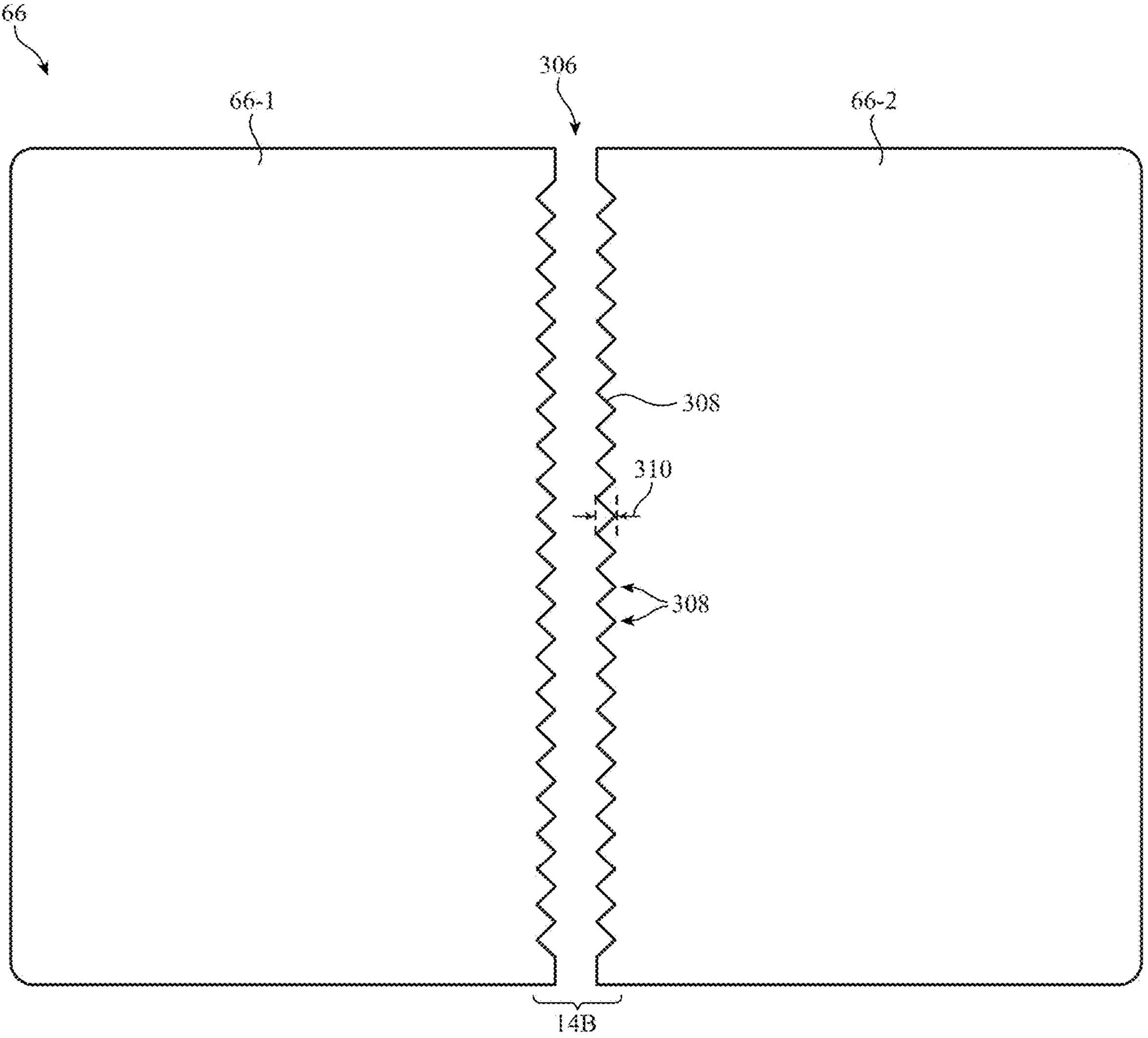
FIG. 29 is a top view of an illustrative adhesive layer with a cutout having recesses of the same depths at an interface that defines the cutout in accordance with some embodiments.

FIG. 29 is a top view of adhesive layer 66 showing the footprint of cutout region 306. As shown, cutout region 306 may extend completely across the footprint of the display within flexible region 14B of the display. In other words, cutout region 306 is elongated in a direction that is parallel to the bend axis associated with flexible region 14B. Adhesive layer 66 has a first portion 66-1 (sometimes referred to as first half) on a first side of cutout region 306 and a second portion 66-2 (sometimes referred to as second half) on a second side of cutout region 306.

In some arrangements, adhesive layer portions 66-1 and 66-2 may have a straight (linear) edge at the interface with cutout region 306. Alternatively, as shown in FIG. 29, layer portions 66-1 and 66-2 may have a non-linear edge at the interface with cutout region 306. Using a non-linear edge as in FIG. 28 may mitigate the visibility of the interface between cutout region 306 and adhesive layer portions 66-1 and 66-2.

The non-linear edge is defined by a plurality of recesses 308 that extend into adhesive layer portions 66-1 and 66-2. The recesses may have a triangular shape that optionally includes a rounded tip. The recesses may alternatively be defined by an edge with the shape of a sine wave. Each recess has a depth 310. These examples of shapes are merely illustrative. In general, each recess 308 may have any desired shape.

In FIG. 29, the magnitude of the depth 310 of each recess 308 is the same (e.g., the shape and size of each recess is the same). This example is merely illustrative. In another possible arrangement, shown in FIG. 30, the recesses may have a varying depth to further mitigate the visibility of the interface between cutout region 306 and adhesive layer portions 66-1 and 66-2.

Figure 30:
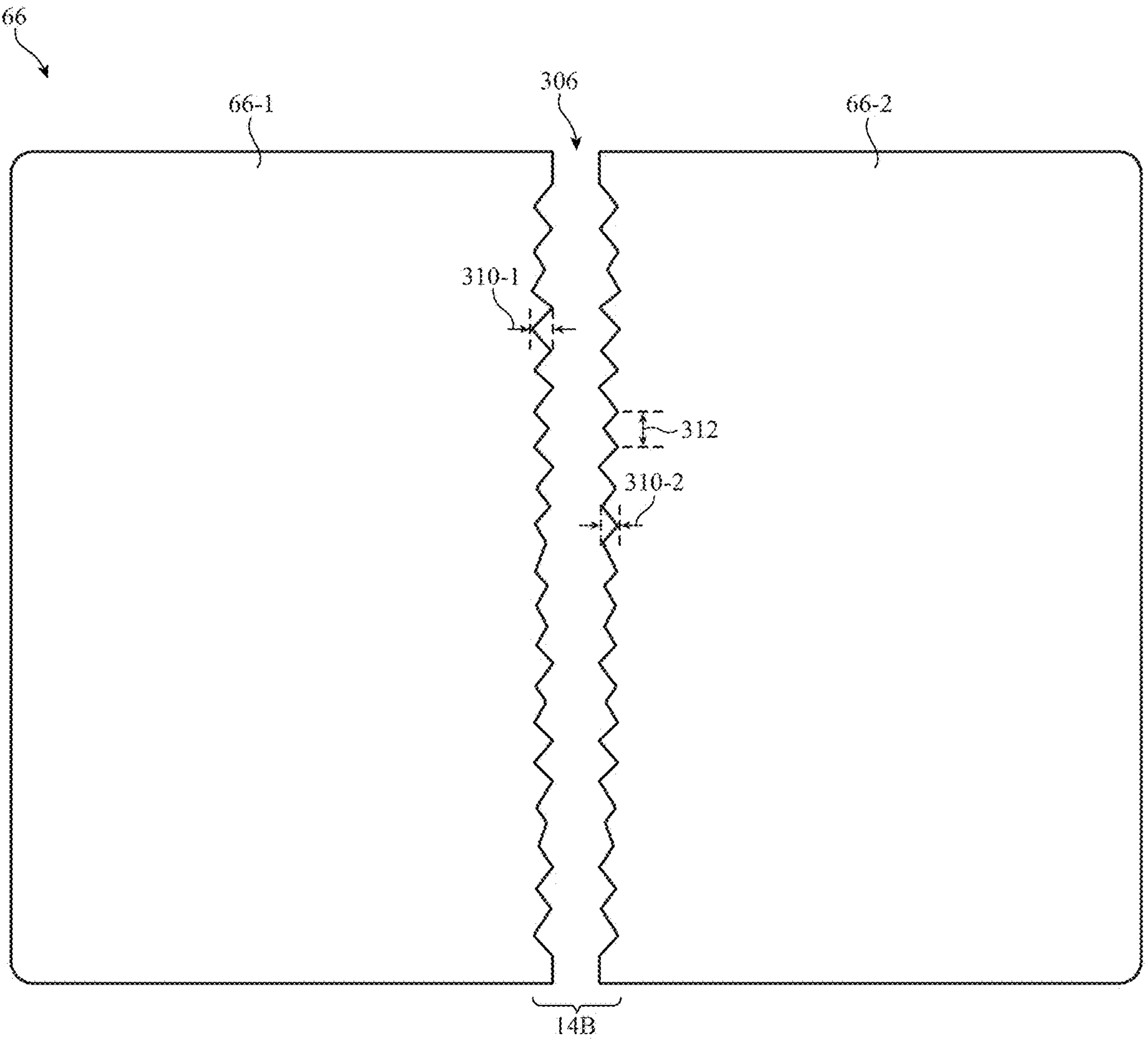
FIG. 30 is a top view of an illustrative adhesive layer with a cutout having recesses of different depths at an interface that defines the cutout in accordance with some embodiments.

As shown in FIG. 30, different recesses that define cutout region 306 may have different depths. Mitigating the periodicity of the interface in this manner may mitigate the visibility of the interface to a viewer. FIG. 30 shows a first recess with a first depth 310-1 having a first magnitude and a second recess with a second depth 310-2 having a second magnitude that is less than the first magnitude. The recesses in a given half of adhesive layer 66 may have at least 2 unique depths (e.g., depths of at least 2 unique magnitudes), at least 4 unique depths, at least 8 unique depths, at least 16 unique depths, etc. The depths of the recesses may vary randomly or according to a pattern (such as the Fibonacci sequence).

The example of varying the depth of recesses 308 in FIG. 30 is merely illustrative. Instead or in addition, the center-to-center pitch 312 of the recesses may be varied to mitigate visibility of the interface between cutout region 306 and adhesive layer portions 66-1 and 66-2. The recesses in a given half of adhesive layer 66 may have at least 2 unique center-to-center pitches, at least 4 unique center-to-center pitches, at least 8 unique center-to-center pitches, at least 16 unique center-to-center pitches, etc.

Figure 31:
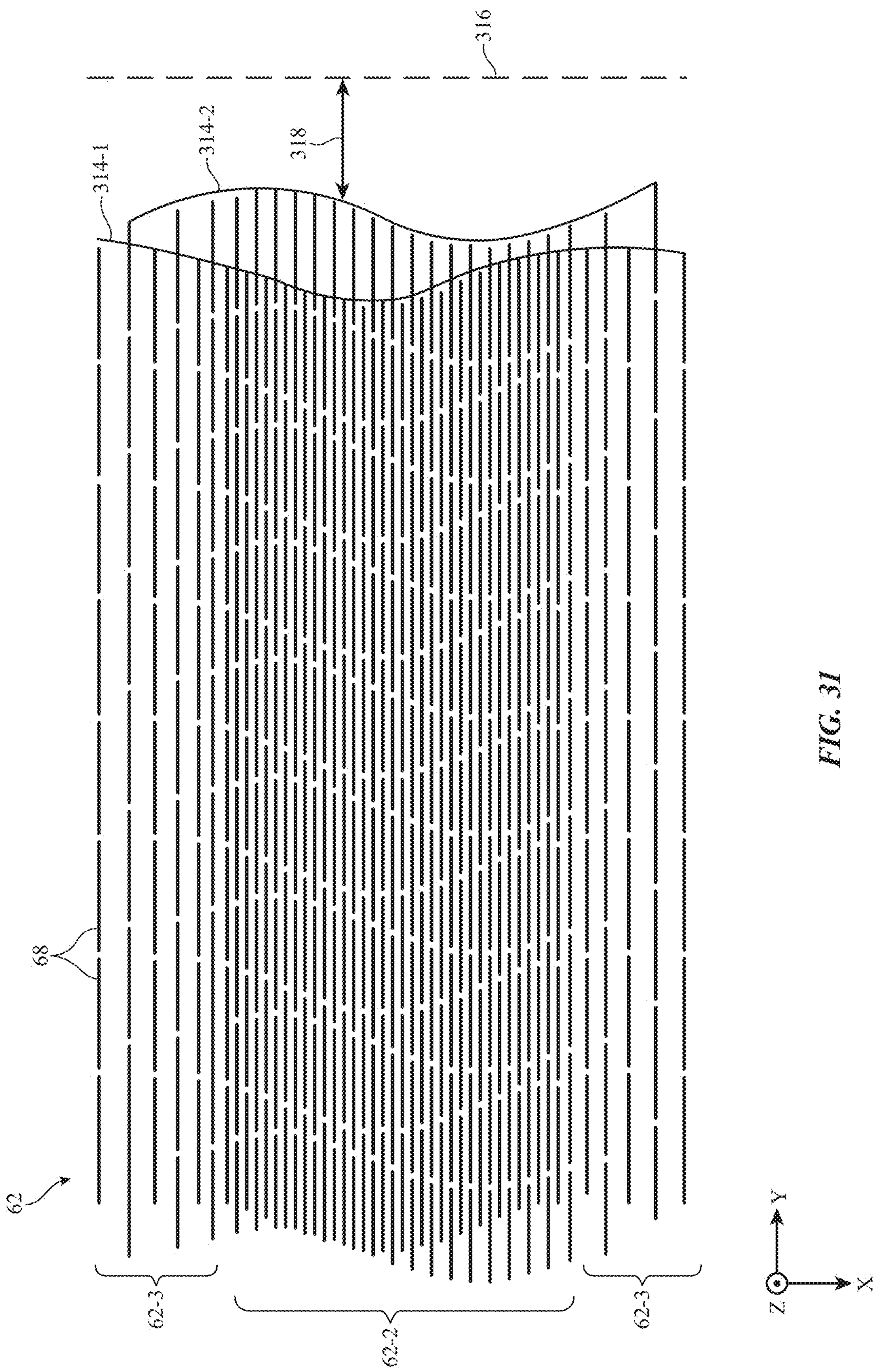
FIG. 31 is a top view of an illustrative Kirigami layer with slots having starting positions that vary according to multiple sinusoidal trendlines in accordance with some embodiments.

Additional mitigation of the visibility of flexible region 14B in display 14 may be achieved by varying the position of slots 68 in bending layer 62. FIG. 31 is a top view of an illustrative bending layer 62 with slots 68 and an edge 316. In FIG. 31, each slot is represented by a respective single dark line. As shown, a first half of the rows of slots (e.g., the odd numbered rows with the top row in FIG. 31 being row #1) may have starting positions that follow a trend line 314-1 whereas a second half of the rows of slots (e.g., the even numbered rows) may have starting positions that follow a trend line 314-2. The starting positions may be defined by a separation 318 in the Y-direction (e.g., the elongated direction of the slots, which is parallel to bend axis 22) between the slot and the edge 316 of bending layer 62.

Each one of trend lines 314 may be non-linear (e.g., sinusoidal). Having the rows of slots follow a non-linear trend line for their starting positions may introduce non-periodicity that mitigates the visibility of slots 68. Having alternating rows of slots follow different sinusoidal trend lines (as in FIG. 31) causes more non-periodicity (and therefore a greater mitigation in visibility) than if all of the rows followed a single sinusoidal trend line.

Figure 32:
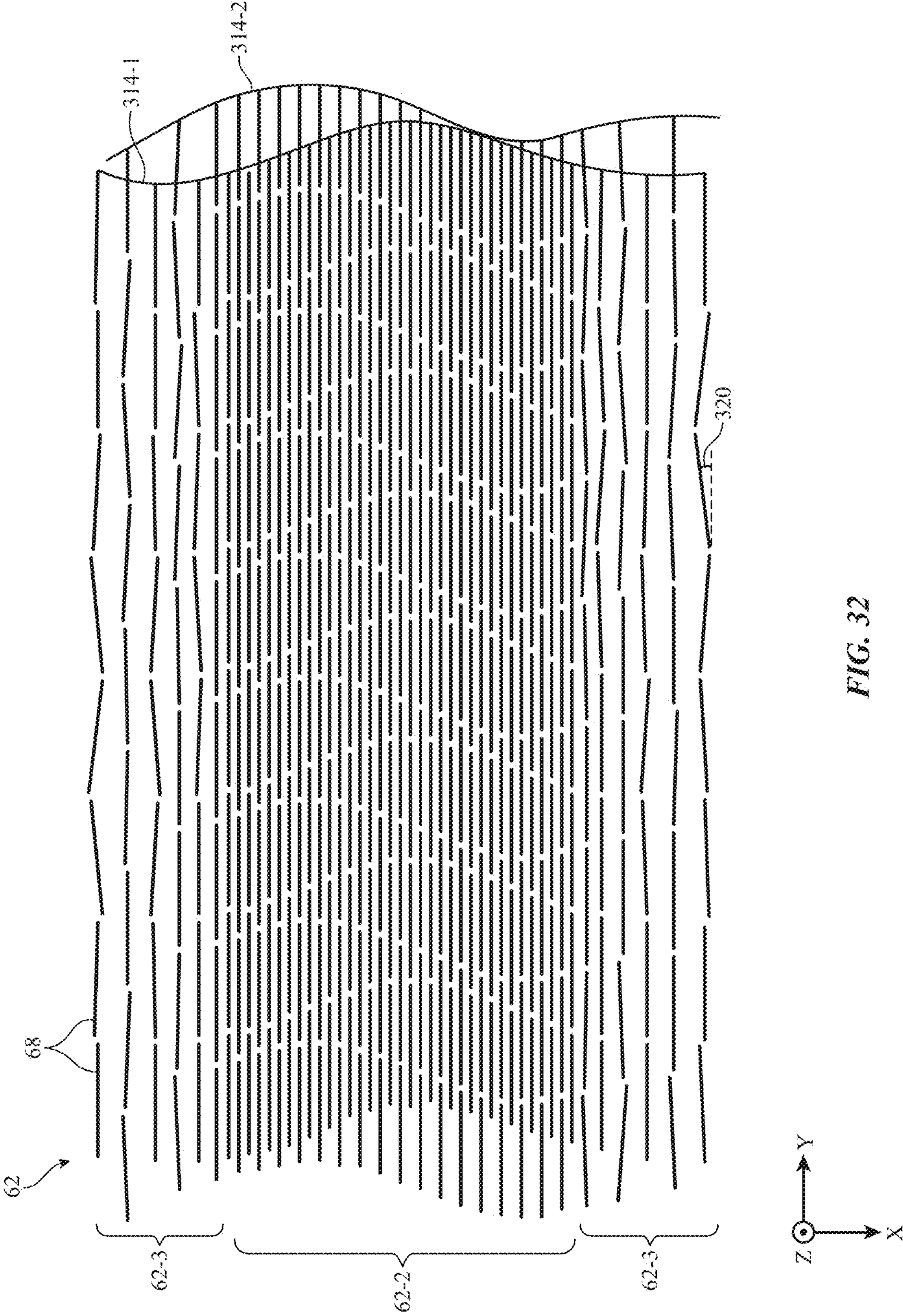
FIG. 32 is a top view of an illustrative Kirigami layer with slots having angles relative to the bend axis that vary according to multiple sinusoidal trendlines in accordance with some embodiments.

Instead or in addition to varying the starting position of the rows of slots to introduce non-periodicity, the angles of the slots may be varied. FIG. 32 is a top view of an illustrative bending layer 62 with slots 68 that have varying angles to reduce periodicity. As shown, each slot 68 in hinge region 62-2 may be parallel to the Y-axis (e.g., parallel to the bending axis for the flexible region 14B of the display). However, at least some of the slots 68 in transition regions 62-3 may be at non-zero angles 320 relative to the Y-axis.

The slots in a given row of slots in transition region 62-3 may have at least 2 unique angles 320, at least 4 unique angles, at least 8 unique angles, at least 16 unique angles, etc. The angles of the recesses may vary randomly or according to a trend such as a sinusoidal trend. Different rows of slots may have angles 320 that follow different sinusoidal trend lines to cause more non-periodicity (and therefore a greater mitigation in visibility) than if all of the rows followed a single sinusoidal trend line.

Figure 33:
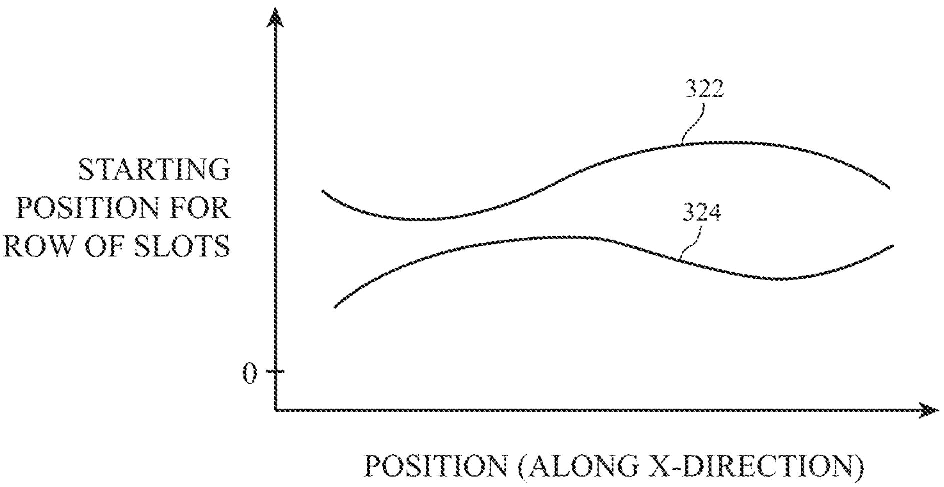
FIG. 33 is an illustrative graph of the starting position for each row of slots in a Kirigami layer as a function of position along the X-direction in accordance with some embodiments.

FIG. 33 is a graph of the starting position for each row of slots (as defined in connection with FIG. 31) as a function of position along the X-direction. The odd numbered rows of slots may follow profile 322 whereas the even numbered rows of slots may follow profile 324. Profiles 322 and 324 may be non-linear (e.g., sinusoidal) and may be different. As examples, the different profiles 322 and 324 may have different amplitudes, wavelengths, and/or starting magnitudes.

Figure 34:
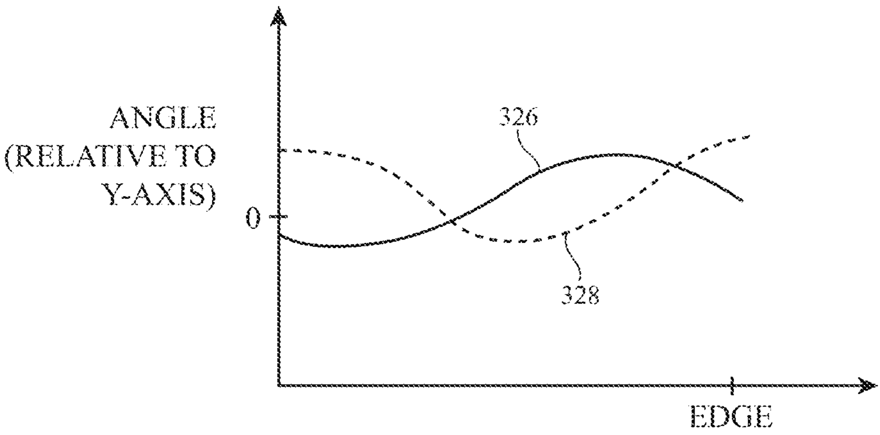
FIG. 34 is an illustrative graph of the angle of each slot in a Kirigami layer relative to the bend axis as a function of position along the Y-direction in accordance with some embodiments.

FIG. 34 is a graph of the angle of each slot relative to the Y-axis (e.g., angle 320 in FIG. 32) as a function of position along the Y-direction. The odd numbered rows of slots may follow profile 326 whereas the even numbered rows of slots may follow profile 328. Profiles 326 and 328 may be non-linear (e.g., sinusoidal) and may be different. As examples, the different profiles 326 and 328 may have different amplitudes, wavelengths, and/or starting magnitudes.

The examples in FIGS. 31-34 of varying the starting position of rows of slots and the angles of the slots relative to the Y-axis to mitigate periodicity are merely illustrative. If desired, one or more additional properties of the slots may be varied to mitigate periodicity. For example, the width of the slots, the length of the slots, the pitch of the slots in the X-direction, and/or the pitch of the slots in the Y-direction may be varied to mitigate periodicity.

Slots 68 may have at least 2 unique widths, at least 4 unique widths, at least 8 unique widths, at least 16 unique widths, etc. Slots 68 may have at least 2 unique lengths, at least 4 unique lengths, at least 8 unique lengths, at least 16 unique lengths, etc. Slots 68 may have at least 2 unique pitches in the X-direction, at least 4 unique pitches in the X-direction, at least 8 unique pitches in the X-direction, at least 16 unique pitches in the X-direction, etc. Slots 68 may have at least 2 unique pitches in the Y-direction, at least 4 unique pitches in the Y-direction, at least 8 unique pitches in the Y-direction, at least 16 unique pitches in the Y-direction, etc.

Figure 35:
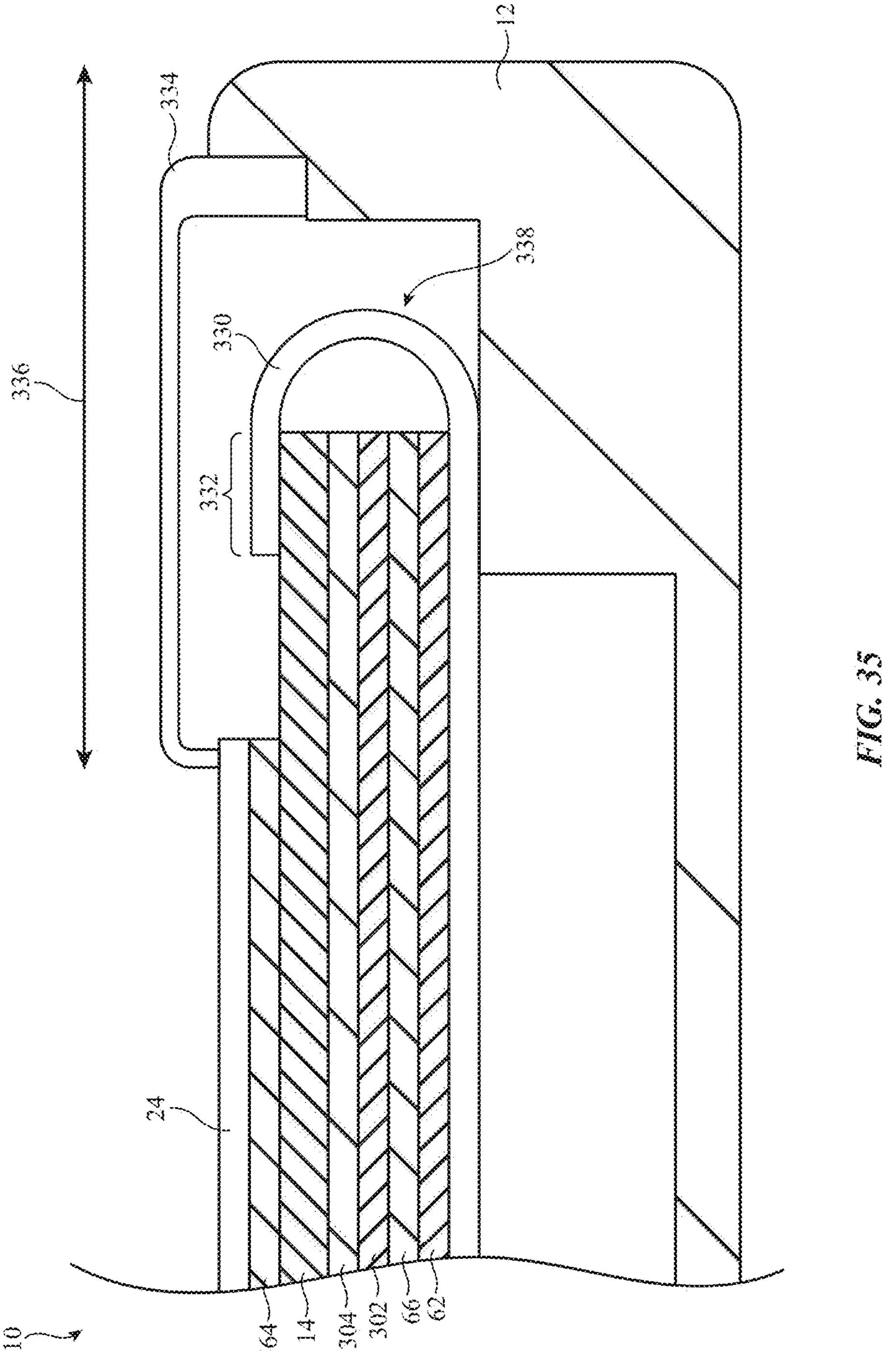
FIG. 35 is a cross-sectional side view of an illustrative electronic device with a flexible printed circuit attached to an edge of a display panel under a trim structure in accordance with some embodiments.

FIG. 35 is a cross-sectional side view of electronic device 10 showing an edge of the electronic device. As shown, display 14 (sometimes referred to as display panel 14) may be attached to display cover layer 24 by adhesive layer 64. One or more layers may be positioned below display panel 14 such as adhesive layer 304, stainless steel layer 302, adhesive layer 66, and bending layer 62 (similar to as shown in the cross-sectional side view of FIG. 28).

As shown in FIG. 35, display panel 14 may have a portion that extends beyond the edge of display cover layer 24. The display panel has an exposed portion (e.g., a portion that is not covered by adhesive layer 64) that is attached to flexible printed circuit 330 at bonding region 332 (sometimes referred to as attachment region 332, interface region 332, etc.). Flexible printed circuit 330 may be used to provide signals such as gate driver signals and/or data signals to display panel 14 (e.g., from a display driver integrated circuit and/or timing controller). As on example, a display driver integrated circuit (DDIC) may be mounted on flexible printed circuit 330 and may provide signals to display panel 14 via traces in flexible printed circuit 330. Flexible printed circuit 330 has a bent portion 338 and wraps around the display panel to a back side of the display panel (e.g., adjacent to bending layer 66 in FIG. 35).

FIG. 35 also shows a housing 12 and trim structure 334. Trim structure 334 may bridge a gap between the edge of display cover layer 24 and housing 12. In FIG. 35, there is a distance 336 between the edge of housing 12 and the edge of trim structure 334. In general, it may be desirable to minimize the magnitude of distance 336 so that the display has a target aesthetic appearance (e.g., with a non-display border region of a minimal size).

Figure 36:
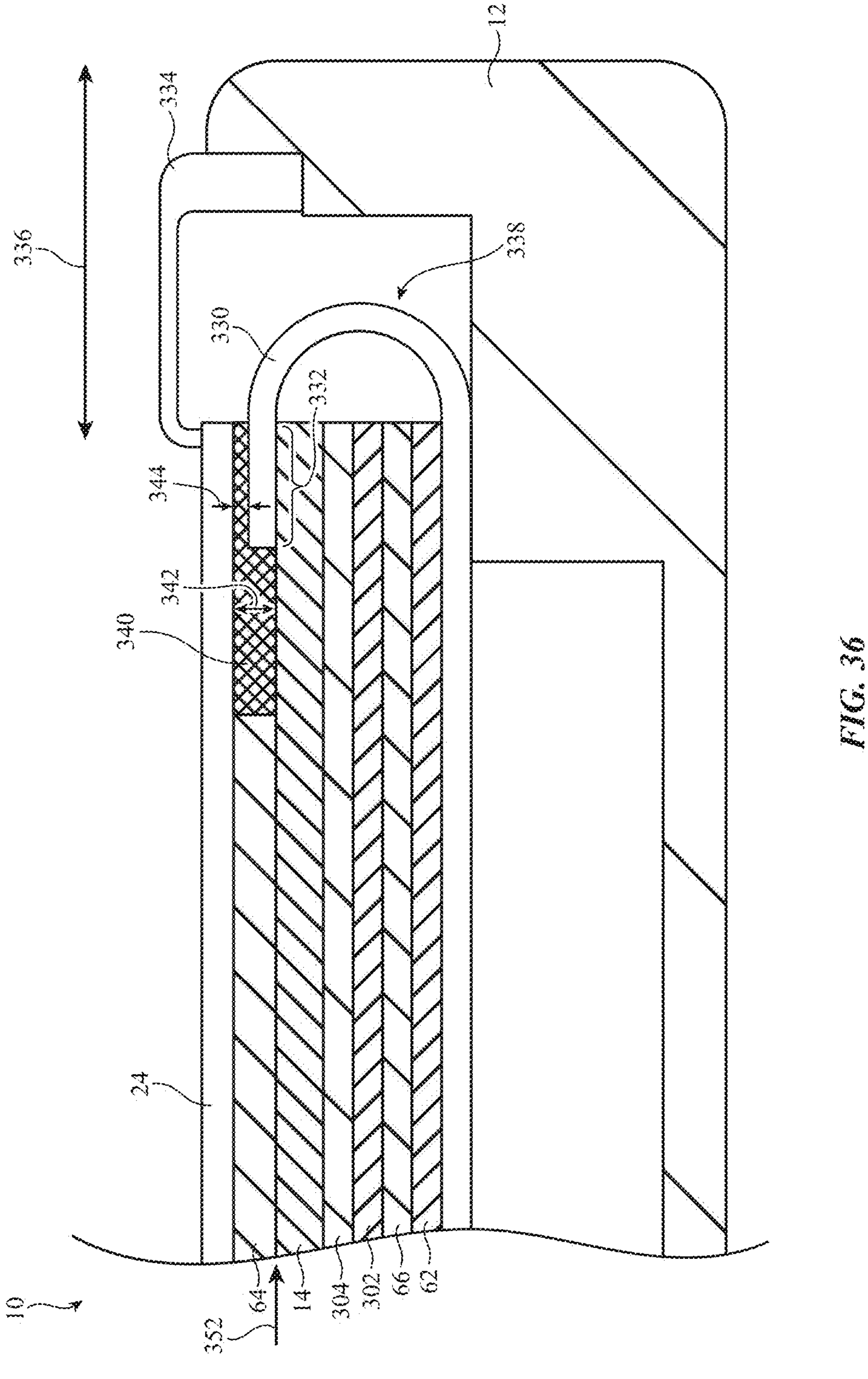
FIG. 36 is a cross-sectional side view of an illustrative electronic device with a flexible printed circuit attached to an edge of a display panel under a gap filler and a display cover layer in accordance with some embodiments.

With the arrangement of FIG. 35, display cover layer 24 is non-overlapping with bonding region 332 between flexible printed circuit 330 and display panel 14. To mitigate the magnitude of distance 336 between the edge of housing 12 and the edge of trim structure 334, it may be desirable for display cover layer 24 to overlap bonding region 332 between flexible printed circuit 330 and display panel 14. FIG. 36 is a cross-sectional side view of an illustrative electronic device in which display cover layer 24 overlaps bonding region 332 between flexible printed circuit 330 and display panel 14.

When display cover layer 24 overlaps bonding region 332 between flexible printed circuit 330 and display panel 14, there may be a risk of damage to the display cover layer. To mitigate this risk, a gap filler 340 may be included under display cover layer 24. As shown in FIG. 36, gap filler 340 (sometimes referred to as gap filler material 340, ultraviolet-light-curable filler 340, etc.) is interposed between display cover layer 24 and display panel 14. In a region that does not overlap/contact flexible printed circuit 330 in bonding region 332, the gap filler 340 has a first thickness 342. In a region that does overlap/contact flexible printed circuit 330 in bonding region 332, the gap filler 340 has a second thickness 344 that is less than thickness 342.

Gap filler 340 may be deposited as a liquid over display panel 14 and flexible printed circuit 330 after the flexible printed circuit has been bonded to display panel 14. Depositing the gap filler as a liquid allows for the gap filler to have multiple portions with different thicknesses as shown in FIG. 36. After deposition, the gap filler material may be cured (e.g., by exposure to ultraviolet light). Because gap filler may be cured by exposure to ultraviolet (UV) light, the gap filler may sometimes be referred to as UV-light-curable material (or simply UV-curable material). After the gap filler is cured, the gap filler material may have a low shear modulus (e.g., less than 5 GPa, less than 3 GPa, less than 1 GPa, less than 0.1 GPa, etc.) to accommodate shear stress applied to the gap filler material during operation of device 10.

With the arrangement of FIG. 36 (e.g., when a gap filler is included between display panel 14 and display cover layer 24 and the display cover layer 24 overlaps bonding region 332), the magnitude of distance 336 is less than in FIG. 35 (e.g., when the gap filler is not included and the display cover layer 24 does not overlap bonding region 332).

Figure 37:
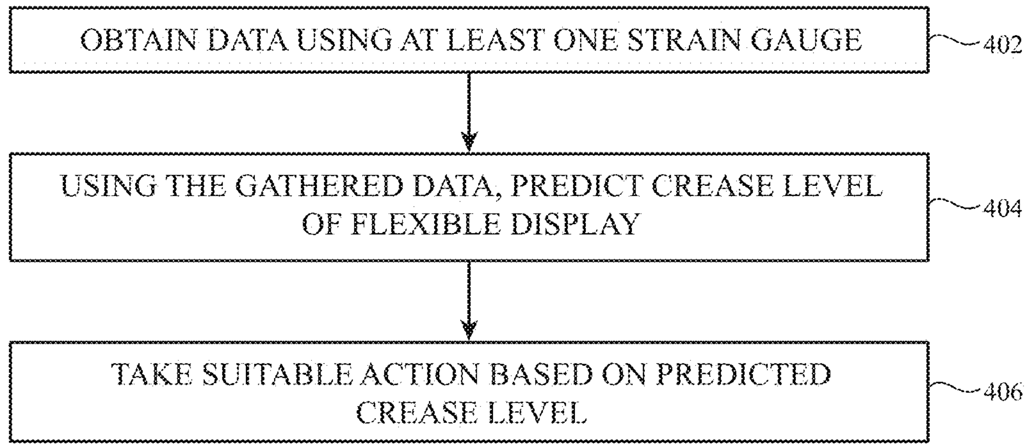
FIG. 37 is a flowchart of an illustrative method for predicting a crease level based on strain gauge data in accordance with some embodiments.

FIG. 37 is a flowchart of an illustrative method for predicting a crease level based on strain gauge data. At block 402, the electronic device (e.g., control circuitry 50) may obtain data using at least one strain gauge such as strain gauge 104. The example of obtaining the data using a strain gauge is merely illustrative and one or more other sensors may be used instead of or in addition to a strain gauge if desired.

The operations of block 402 may include obtaining data with one or more motion sensors such as motion sensors 508 if desired.

At block 404, control circuitry 50 may, based on at least the data gathered at block 402 (e.g., strain gauge data and/or motion sensor data), predict a crease level associated with the flexible display. Over time, flexible display 14 may be repeatedly folded and unfolded. This may cause a crease to form in one or more layers of electronic device 10 within flexible region 14B. The crease may be formed, for example, in display cover layer 24, adhesive layer 64, display panel 14, and/or a touch sensor layer associated with display panel 14. Predicting the crease level may include predicting the crease level in one or more of the layers in electronic device such as display cover layer 24, adhesive layer 64, display panel 14, and/or the touch sensor layer. The strain gauge data from block 402 may be used to predict whether or not a crease is present and, if present, the depth of the crease.

At block 406, control circuitry 50 may take suitable action based on the predicted crease level from block 404. One example of an action that may be taken at block 406 is compensating touch sensor data. Display 14 may be a touch-sensitive display with a touch sensor layer. The touch sensor layer may be interposed between the display panel and the display cover layer, such as at location 352 in FIG. 36. The touch sensor layer may determine a location at which a user is touching the display (e.g., with a finger or an accessory such as a stylus). The touch sensor layer may optionally determine a force with which the user is touching the display and/or a hover distance between the display and the finger/stylus.

These touch sensor measurements may be impacted by the presence of a crease in display 14. The touch sensor data obtained by the touch sensor layer may therefore be compensated by control circuitry 50 based on the predicted crease level.

The slots in bending layer 62 may be filled with air (as shown in FIGS. 15-18 and 28, as examples). Alternatively, as shown in FIG. 38, the slots in bending layer 62 may be filled with a filler material 502. Filler material 502 may have a low transparency (and correspondingly high opacity) to mitigate visible artifacts. In other words, the filler material may have a transparency that matches the transparency of the bulk of bending layer 62. The filler material may have a transparency that is less than 50%, less than 30%, less than 20%, less than 10%, less than 5%, less than 3%, etc. The transparencies of filler material 502 and the bulk of bending layer 62 may differ by less than 20%, less than 10%, less than 5%, less than 3%, less than 1%, etc.

Moreover, the filler material may have a relatively low Young's modulus. The Young's modulus of the filler material may be less than 10 GPa, less than 5 GPa, less than 3 GPa, less than 2.5 GPa, less than 2 GPa, less than 1.5 GPa, less than 1 GPa, less than 500 MPa, less than 250 MPa, less than 100 MPa, less than 10 MPa, less than 1 MPa, less than 500 kPa, less than 250 kPa, less than 100 kPa, less than 50 kPa, less than 10 kPa, etc.

Filler material 502 may entirely fill each slot 68 in bending layer 62. In addition, the filler material may optionally be formed in a continuous layer on either side of the bending layer. As shown in FIG. 38, an optional layer 504 and/or an optional layer 506 of the filler material may be formed in a continuous layer across the portion of bending layer 62 that includes slots 68. The optional layers 504 and/or 506 may simplify the manufacturing process when manufacturing a bending layer that includes slots with filler material.

If desired, each slot may have a cross-sectional shape with one or more interlock structures to ensure filler material 502 remains within slot 68 during long term operation of electronic device 10. FIG. 39A is a side view of an illustrative bending layer 62 with a slot 68 having an interlock structure 68-I. The interlock structure may have a trapezoidal cross-sectional shape with a width that increases towards the edge of the bending layer. Bending layer 62 has first and second opposing sides (e.g., upper and lower sides). The display panel is adjacent to the first side of the bending layer (e.g., the first side of the bending layer is interposed between the display panel and the second side of the bending layer). In FIG. 39A, interlock structure 68-I is formed on the side of the slot adjacent to the first side of the bending layer. In FIG. 39B, interlock structure 68-I is formed on the side of the slot adjacent to the second side of the bending layer. In FIG. 39C, slot 68 includes a first interlock structure 68-I1 on the side of the slot adjacent to the first side of the bending layer and a second interlock structure 68-I2 on the side of the slot adjacent to the second side of the bending layer.

In general, each slot may have any desired cross-sectional shape. Different slots in bending layer 62 may have different cross-sectional shapes if desired.

The foregoing is merely illustrative and various modifications can be made to the described embodiments. The foregoing embodiments may be implemented individually or in any combination.

What is claimed is:

1. An electronic device comprising:

a flexible display with a first portion, a second portion that is aligned with a bend axis that extends in a first direction, and a third portion, wherein the second portion is interposed between the first and third portions and wherein the first portion is configured to bend relative to the third portion about the bend axis;

at least one strain gauge that is aligned with the bend axis, wherein data from the at least one strain gauge is used to determine a speed associated with bending the flexible display;

control circuitry configured to determine if the speed associated with bending the flexible display is greater than a maximum recommended speed; and an output device configured to output a notification when the speed associated with bending the flexible display is greater than the maximum recommended speed.

2. The electronic device defined in claim 1, wherein the output device is further configured to output the notification based on a temperature.

3. The electronic device defined in claim 2, further comprising:

a temperature sensor that measures the temperature.

4. The electronic device defined in claim 2, wherein the temperature is determined using the data from the at least one strain gauge.

5. The electronic device defined in claim 1, wherein the maximum recommended speed is associated with a temperature, wherein the control circuitry is further configured to obtain the maximum recommended speed using a lookup table, and wherein the lookup table includes a plurality of maximum recommended speeds associated with a plurality of temperatures.

6. The electronic device defined in claim 1, wherein the output device comprises a component selected from the group consisting of: a display, a speaker, and a haptic output device.

7. An electronic device comprising:

a flexible display with a first portion, a second portion that is aligned with a bend axis that extends in a first direction, and a third portion, wherein the second portion is interposed between the first and third portions and wherein the first portion is configured to bend relative to the third portion about the bend axis;

a display cover layer that overlaps the flexible display, wherein the display cover layer comprises glass and wherein the display cover layer has an upper surface and a side surface;

a first adhesive layer between the flexible display and the display cover layer; and a second adhesive layer that conforms to and directly contacts the upper surface and the side surface of the display cover layer.

8. The electronic device defined in claim 7, further comprising:

a matte layer that is attached to the display cover layer using the second adhesive layer.

9. The electronic device defined in claim 8, wherein the matte layer comprises a first microlens of a first size and a second microlens of a second size that is different than the first size.

10. The electronic device defined in claim 7, wherein the side surface of the display cover layer extends around an entire perimeter of the display cover layer and wherein the second adhesive layer directly contacts all of the side surface of the display cover layer.

11. The electronic device defined in claim 7, wherein the side surface of the display cover layer extends along a first edge of a perimeter of the display cover layer and wherein the display cover layer further comprises:

a first additional side surface that extends along a second edge of the perimeter;

a second additional side surface that extends along a third edge of the perimeter; and a third additional side surface that extends along a fourth edge of the perimeter, wherein the second adhesive layer directly contacts the first additional side surface, the second additional side surface, and the third additional side surface.

12. The electronic device defined in claim 1, wherein the flexible display comprises an array of pixels and a thin-film transistor circuitry layer with thin-film transistor circuitry that controls the array of pixels and wherein the at least one strain gauge is part of the thin-film transistor circuitry layer.

13. The electronic device defined in claim 1, wherein the at least one strain gauge comprises conductive traces.

14. The electronic device defined in claim 13, wherein the conductive traces are formed from a same metal layer as a data line or a gate line.

15. The electronic device defined in claim 13, wherein the conductive traces are formed from a same metal layer as a gate for a transistor.

16. An electronic device comprising:

a flexible display with a first portion, a second portion that is aligned with a bend axis that extends in a first direction, and a third portion, wherein the second portion is interposed between the first and third portions and wherein the first portion is configured to bend relative to the third portion about the bend axis;

a display cover layer that overlaps the flexible display, wherein the display cover layer has first and second opposing surfaces and wherein the first surface is interposed between the second surface and the flexible display;

an adhesive layer that conforms to and directly contacts the second surface of the display cover layer; and a matte layer that is attached to the display cover layer using the adhesive layer, wherein the matte layer has a diffuse reflection that is greater than 40%.

17. The electronic device defined in claim 16, wherein the matte layer comprises a polymer substrate with a transparency that is greater than 90%.

18. The electronic device defined in claim 17, wherein the matte layer further comprises patterned features on an upper surface of the polymer substrate.

19. The electronic device defined in claim 18, wherein the patterned features comprise first microlenses of a first diameter and second microlenses of a second diameter that is different than the first diameter.

20. The electronic device defined in claim 18, wherein the patterned features comprise first microlenses of a first thickness and second microlenses of a second thickness that is different than the first thickness.

* * * * *